(12) United States Patent
Gomez Martinez et al.

(10) Patent No.: US 12,717,018 B2
(45) Date of Patent: Aug. 25, 2026

(54) LOCATION OF TARGET OBJECT USING WIRELESS RANGING AND USER EQUIPMENT POSITIONS

(71) Applicant: QUALCOMM Incorporated, San Diego, CA (US)

(72) Inventors: Feliciano Gomez Martinez, Los Gatos, CA (US); Stephen Jay Shellhammer, Ramona, CA (US); Bin Tian, San Diego, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 18/340,350

(22) Filed: Jun. 23, 2023

(65) Prior Publication Data

US 2024/0427007 A1 Dec. 26, 2024

(51) Int. Cl.
*G01S 13/76* (2006.01)

(52) U.S. Cl.
CPC .................................. *G01S 13/762* (2013.01)

(58) Field of Classification Search
None
See application file for complete search history.

(56) References Cited

U.S. PATENT DOCUMENTS

2017/0090010 A1 3/2017 Dackefjord et al.
2018/0348352 A1 12/2018 Ogston et al.
2020/0182995 A1* 6/2020 Zeng ..................... G01S 13/003
2022/0116886 A1* 4/2022 Manolakos ............. G01S 7/023
2022/0171016 A1* 6/2022 Manolakos ......... H04L 41/0803
2022/0390541 A1* 12/2022 Chen ......................... G01S 5/04
2023/0345412 A1 10/2023 Jia et al.
2023/0421215 A1* 12/2023 Duan .................. H04B 7/0417
2024/0112009 A1* 4/2024 Orekondy ............ H04B 17/391
2025/0189656 A1* 6/2025 Huang ................... G01S 7/006

FOREIGN PATENT DOCUMENTS

WO 2022143518 A1 7/2022

OTHER PUBLICATIONS

International Search Report and Written Opinion—PCT/US2024/026047—ISA/EPO—Aug. 26, 2024.

* cited by examiner

*Primary Examiner* — Idowu O Osifade
(74) *Attorney, Agent, or Firm* — Weaver Austin Villeneuve & Sampson LLP

(57) ABSTRACT

A method for locating a target object, includes: determining a plurality of position-distance values, each of the plurality of position-distance values includes: a position of a user equipment relative to a reference position; and a distance corresponding to the position of the user equipment, the distance being between the position of the user equipment and the target object measured using one or more wireless ranging signals between the user equipment and the target object, where each position of the user equipment in the plurality of position-distance values is different; and calculating a position of the target object using the plurality of position-distance values, where the position of the target object is relative to the reference position.

23 Claims, 15 Drawing Sheets

LOCATION OF TARGET OBJECT USING WIRELESS RANGING AND USER EQUIPMENT POSITIONS

BACKGROUND

Finding a lost object using wireless signals between a user equipment and a lost object often relies on the availability of multiple antennas for the determination of Angle of Arrival (AoA) information. The inclusion of AoA antennas on a device requires additional components, printed circuit board space, and special calibration. Without the multiple antennas, AoA information is not available for the finding of the object.

SUMMARY

In an embodiment, a method for locating a target object includes: determining, by one or more processors, a plurality of position-distance values, each of the plurality of position-distance values including: a position of a user equipment relative to a reference position; and a distance corresponding to the position of the user equipment, the distance being between the position of the user equipment and the target object measured using one or more wireless ranging signals between the user equipment and the target object, where the position of the user equipment in each of the plurality of position-distance values is different; and calculating, by the one or more processors, a position of the target object using the plurality of position-distance values, where the position of the target object is relative to the reference position.

In another embodiment, a computing device, includes: means for determining a plurality of position-distance values, each of the plurality of position-distance values including: a position of a user equipment relative to a reference position; and a distance corresponding to the position of the user equipment, the distance being between the position of the user equipment and a target object measured using one or more wireless ranging signals between the user equipment and the target object, where the position of the user equipment in each of the plurality of position-distance values is different; and means for calculating a position of the target object using the plurality of position-distance values, where the position of the target object is relative to the reference position.

In another embodiment, a user equipment, including: one or more memories; and one or more processors communicatively coupled to the one or more memories, the one or more processors being configured to: determine a plurality of position-distance values, each of the plurality of position-distance values including: a position of the user equipment relative to a reference position; and a distance corresponding to the position of the user equipment, the distance being between the position of the user equipment and a target object measured using one or more wireless ranging signals between the user equipment and the target object, where the position of the user equipment in each of the plurality of position-distance values is different; and calculate a position of the target object using the plurality of position-distance values, where the position of the target object is relative to the reference position.

In another embodiment, a non-transitory, processor-readable storage medium including processor-readable instructions to cause one or more processors to: determine a plurality of position-distance values, each of the plurality of position-distance values including: a position of a user equipment relative to a reference position; and a distance corresponding to the position of the user equipment, the distance being between the position of the user equipment and a target object measured using one or more wireless ranging signals between the user equipment and the target object, where the position of the user equipment in each of the plurality of position-distance values is different; and calculate a position of the target object using the plurality of position-distance values, where the position of the target object is relative to the reference position.

DETAILED DESCRIPTION

Techniques are discussed herein for determining a location of a target object using wireless ranging signals and positions of a user equipment (UE). For example, the UE and the target object are each configured to support wireless communication using one or more wireless signals that support wireless ranging techniques. To locate the target object, the UE moves to different locations within an environment. At each location, a position of the UE is calculated, using information from components of the UE, such as sensors. Also at each location, a distance between the position and the target object is measured using one or more wireless ranging signals between the UE and the target object. The position and the distance at each location form a position-distance value. Using the combination of the different position-distance values, the position of the target object is calculated. Directional information may be displayed to the user based on the position of the target object. For example, the directional information may direct the user toward a certain direction for a certain distance. Such directional information provides the user with an estimated area within which the target object may be located. As the user continues to move the UE, the position of the target object can be updated, and updated directional information can be provided to the user.

Items and/or techniques described herein may provide one or more of the following capabilities, as well as other capabilities not mentioned. A position of a target object may be calculated without using Angle of Arrival (AoA) information. A UE may be able to locate a target object without including multiple antennas or without requiring multiple antennas for determining AoA. Since multiple antennas increase the cost of the UE, the functionality of finding lost objects can be provided without incurring the additional costs of multiple antennas. Locating target objects is possible on UEs that do not have multiple antennas. Other capabilities may be provided and not every implementation according to the disclosure must provide any, let alone all, of the capabilities discussed.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

Figure 1:
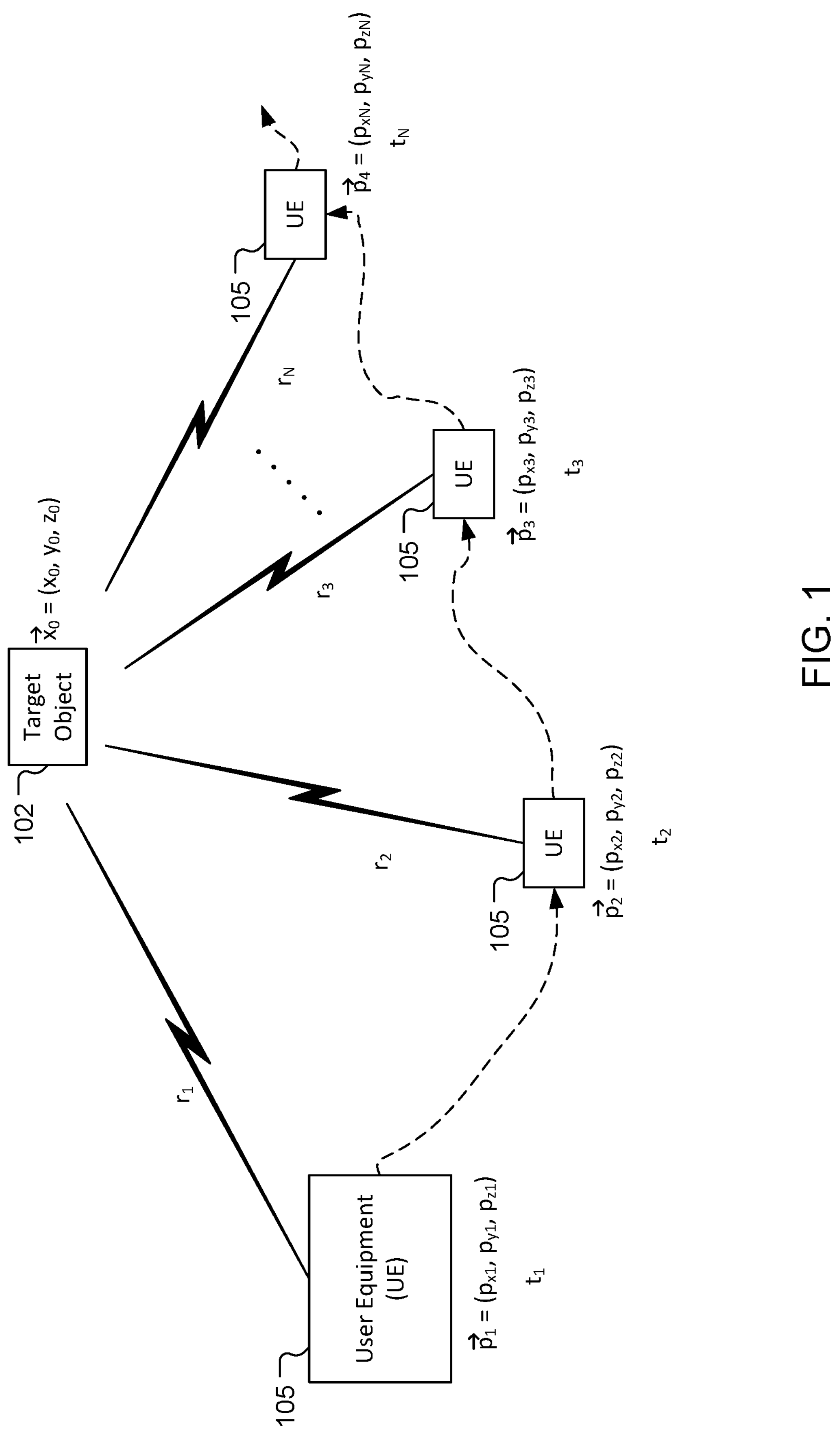
FIG. 1 is a simplified diagram of an example system including a user equipment and a target object to be found.

FIG. 1 is a simplified diagram of an example system including a user equipment and a target object to be found. In general, the user equipment (UE) 105 may be any wireless communication device (e.g., a mobile phone, router, tablet computer, laptop computer, consumer asset tracking device, Internet of Things (IoT) device, etc.). A UE 105 may be mobile or may (e.g., at certain times) be stationary. As used herein, the term “UE” may be referred to interchangeably as an “access terminal” or “AT,” a “client device,” a “wireless device,” a “subscriber device,” a “subscriber terminal,” a “subscriber station,” a “user terminal” or UT, a “mobile terminal,” a “mobile station,” a “mobile device.” or variations thereof. The UE 105 may be embodied by any of a number of types of devices including but not limited to printed circuit (PC) cards, compact flash devices, external or internal modems, wireless or wireline phones, smartphones, tablets, consumer asset tracking devices, asset tags, and so on. The UE 105 may comprise and/or may be referred to as a device, a mobile device, a wireless device, or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, virtual reality headsets, augmented reality glasses, or some other portable or moveable device. The UE 105 supports wireless communication with the target object 102 using one or more Radio Access Technologies (RATs) such as IEEE 802.11 WiFi® (also referred to as Wi-Fi®), Bluetooth® (BT), Ultra-wideband (UWB), etc., that may be used by wireless ranging techniques.

The target object 102 may be another UE. The target object may be any of a variety of devices, e.g., a set of earbuds (or one earbud), earbud chargers, a set of headphones, a smart tag, or any other device capable of wireless communication with the UE 105 using one or more of the RATs that may be used for wireless ranging.

Referring to FIG. 1, to locate the target object 102 according to an example embodiment, the UE 105 moves to different locations. The UE 105 communicates with the target object 102 using signals of one or more RATs. A position of the UE 105 at each location and a distance between the position of the UE 105 and the target object 102 are determined, as described further below. The combination of the position-distance values at the different locations are used to calculate the position of the target object 102, as described further below with reference to FIGS. 2-10.

The position of the UE 105 may be referred to as a position estimate, or position fix, and may be geographic, e.g., location coordinates for the UE 105 in three-dimensional space. A position of the UE 105 may be expressed as an area or volume within which the UE 105 is expected to be located with some probability or confidence level (e.g., 67%, 95%, etc.). A position of the UE 105 may be expressed as a relative position comprising, for example, a distance and direction from a reference position. The relative position may be expressed as relative coordinates (e.g., $\Delta X$, $\Delta Y$, and $\Delta Z$ coordinates) defined relative to the reference position. In the description contained herein, the use of the term “position” may comprise any of these variants unless indicated otherwise.

Figure 2A:
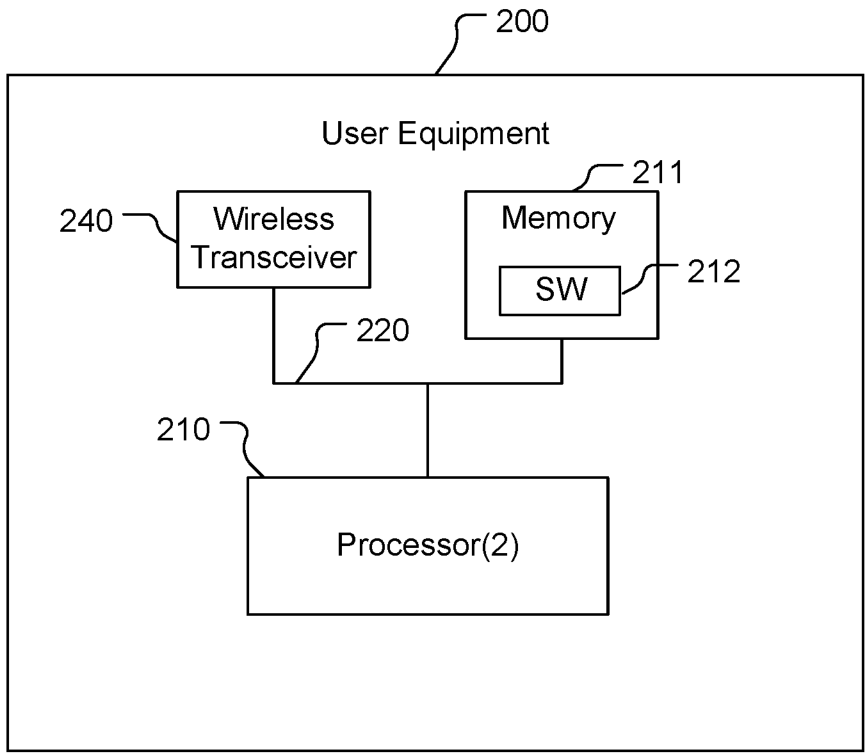
FIG. 2A illustrates an example of a user equipment.

FIG. 2A illustrates an example user equipment 200. The UE 200 may be an example of UE 105. The UE 200 may comprise one or more processors 210, one or more memories 211 including software (SW) 212, and one or more wireless transceivers 240, although any of these devices may be referred to in the singular (e.g., the processor 210) while including one or more of the respective devices. The one or more processors 210 and the one or more memories 211 may be communicatively coupled to each other by a bus 220 (which may be configured, e.g., for optical and/or electrical communication). The transceiver 240 is configured for wireless communication using one or more RATs.

Figure 2B:
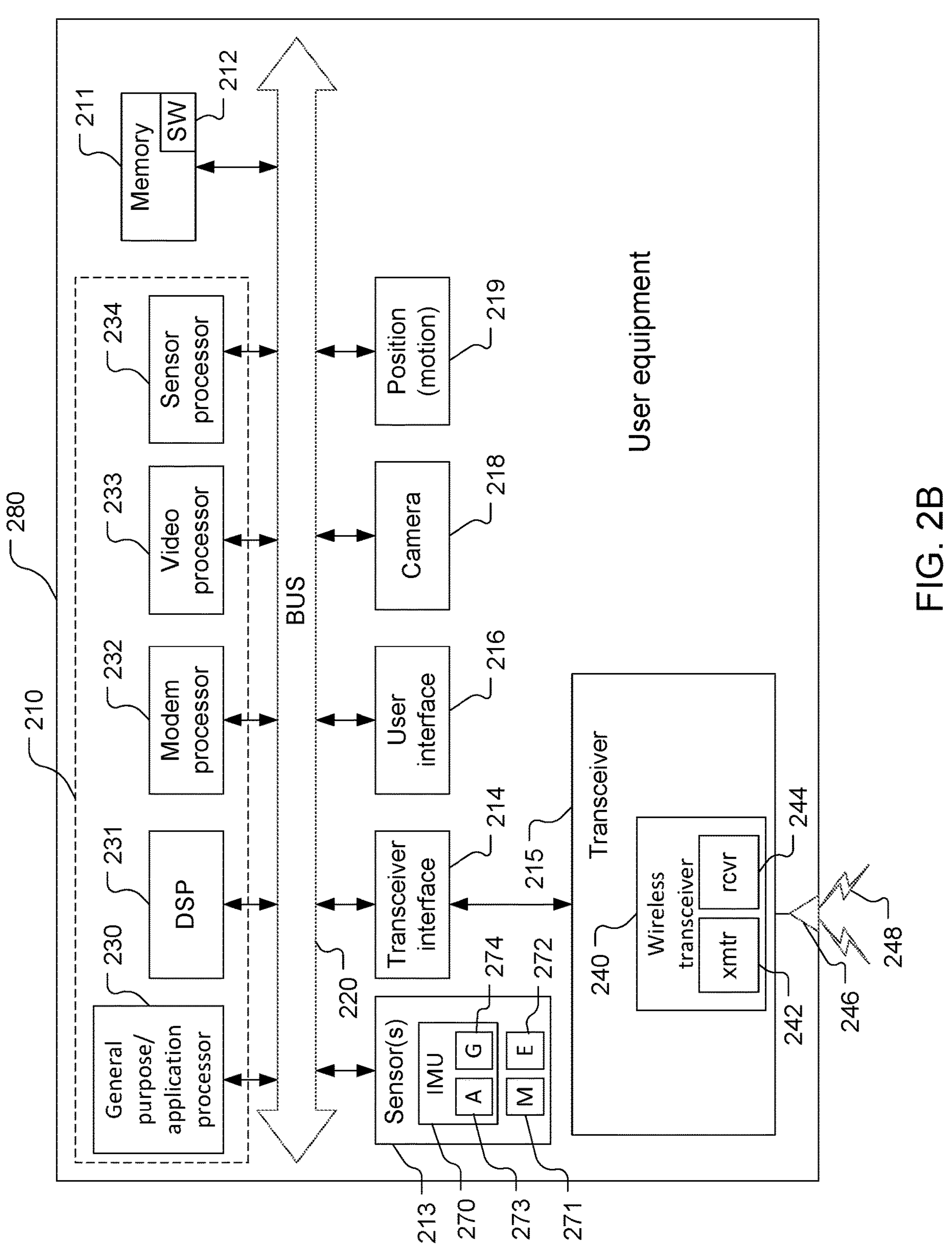
FIG. 2B shows a block diagram of components of the example of the user equipment shown in FIG. 2A.

FIG. 2B illustrates an example user equipment 280. The UE 280 may be an example of the UE 200 shown in FIG. 2A. The UE 280 may comprise a computing platform including one or more processors 210, one or more memories 211 including software (SW) 212, one or more sensors 213, a transceiver interface 214 for the transceiver 215 that includes the wireless transceiver 240, a user interface 216, a camera 218, and a position device (PD) 219. The one or more processors 210, the one or more memories 211, the one or more sensors 213, the transceiver interface 214, the user interface 216, the camera 218, and the position device 219 may be communicatively coupled to each other by a bus 220 (which may be configured, e.g., for optical and/or electrical communication). The one or more processors 210 may include one or more intelligent hardware devices, e.g., a central processing unit (CPU), one or more microcontrollers, an application specific integrated circuit (ASIC), etc. The one or more processors 210 may comprise multiple processors including one or more general-purpose/application processors 230, one or more Digital Signal Processors (DSP) 231, one or more modem processors 232, one or more video processors 233, and/or one or more sensor processors 234. For example, the sensor processor 234 may comprise, e.g., processors for RF (radio frequency) sensing (with one or more wireless signals transmitted and reflection(s) used to identify, map, and/or track an object), and/or ultrasound, etc. The one or more modem processors 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 280 for connectivity. The one or more memories 211 may be one or more non-transitory storage media that may include random access memory (RAM), flash memory, disc memory, and/or read-only memory (ROM), etc. The one or more memories 211 may store the software 212 which may be processor-readable, processor-executable software code containing instructions that may be configured to, when executed, cause the one or more processors 210 to perform various functions described herein. Alternatively, the software 212 may not be directly executable by the one or more processors 210 but may be configured to cause the one or more processors 210, e.g., when compiled and executed, to perform the functions. The description herein may refer to the one or more processors 210 performing a function, but this includes other implementations such as where the one or more processors 210 executes software and/or firmware. The description herein may refer to the one or more processors 210 performing a function as shorthand for one or more of the processors 230-234 performing the function. The description herein may refer to the UE 280 performing a function as shorthand for one or more appropriate components of the UE 280 performing the function. Functionality of the one or more processors 210 is discussed more fully below.

The configuration of the UE 280 shown in FIG. 2B is an example and not limiting of the disclosure, including the claims, and other configurations may be used. For example, an example configuration of the UE 280 includes one or more of the processors 230-234 of the processor 210, the memory 211, a wireless transceiver, and one or more of the sensor(s) 213, the user interface 216, the camera 218, and/or the PD 219.

The UE 280 may comprise the modem processor 232 that may be capable of performing baseband processing of signals received and down-converted by the transceiver 215. The modem processor 232 may perform baseband processing of signals to be upconverted for transmission by the transceiver 215. Also, or alternatively, baseband processing may be performed by the general-purpose/application processor 230 and/or the DSP 231. Other configurations, however, may be used to perform baseband processing.

The UE 280 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 280 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 280 is fixed (stationary) or mobile. For example, for relative positioning information, the sensors/IMU may be used to determine the angle and/or orientation of the other device with respect to the UE 280, etc.

The IMU 270 may be configured to provide measurements about a direction of motion and/or a speed of motion of the UE 280, which may be used in relative location determination. For example, the one or more accelerometers 273 and/or the one or more gyroscopes 274 of the IMU 270 may detect, respectively, a linear acceleration and a speed of rotation of the UE 280. The linear acceleration and speed of rotation measurements of the UE 280 may be integrated over time to determine an instantaneous direction of motion as well as a displacement of the UE 280. The instantaneous direction of motion and the displacement may be integrated to track a location of the UE 280. For example, a reference position of the UE 280 may be determined for a moment in time and measurements from the accelerometer(s) 273 and the gyroscope(s) 274 taken after this moment in time may be used (e.g., in dead reckoning) to determine present position of the UE 280 based on movement (direction and distance) of the UE 280 relative to the reference location.

The magnetometer(s) 271 may determine magnetic field strengths in different directions which may be used to determine orientation of the UE 280. For example, the orientation may be used to provide a digital compass for the UE 280. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the one or more processors 210.

The transceiver 215 may include a wireless transceiver 240 configured to communicate with other devices through wireless connections. For example, the wireless transceiver 240 may include a wireless transmitter 242 and a wireless receiver 244 coupled to an antenna 246 for transmitting and/or receiving wireless signals 248 and transducing signals from the wireless signals 248 to wired (e.g., electrical and/or optical) signals and from wired (e.g., electrical and/or optical) signals to the wireless signals 248. The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals according to a variety of radio access technologies (RATs) such as IEEE 802.11 (including IEEE 802.11az), WiFi®, WiFi®; Direct (WiFi®-D), Bluetooth®, Ultra-Wide Band (UWB) (including 802.15.4), etc. A "radio", as used herein, refers to a wireless transmitter and/or wireless receiver configured to communicate signals according to a specific RAT. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 280. For example, the user interface 216 may store indications of analog and/or digital signals in the one or more memories 211 to be processed by DSP 231 and/or the general-purpose/application processor 230 in response to action from a user or a request from an application. Similarly, applications hosted on the UE 280 may store indications of analog and/or digital signals in the one or more memories 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also, or alternatively, the user interface 216 may comprise one or more touch sensors responsive to touching and/or pressure, e.g., on a keyboard and/or touch screen of the user interface 216.

The UE 280 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also, or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 280, motion of the UE 280, and/or relative position of the UE 280, and/or time. The PD 219 may work in conjunction with the one or more processors 210 and the one or more memories 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 280 using terrestrial-based signals (e.g., at least some of the wireless signals 248) for trilateration. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 280. The PD 219 may be configured to determine a relative motion or orientation by the UE 280 by comparing multiple images captured by the camera 218 and tracking how a common "point of interest" within the images moves between images. The PD 219 may be configured to use one or more other techniques (e.g., relying on the UE's self-reported location (e.g., part of the UE's position beacon)) for determining the location of the UE 280, and may use a combination of techniques (e.g., satellite and terrestrial positioning signals) to determine the location of the UE 280. The PD 219 may include one or more of the sensors 213 (e.g., gyroscope(s), accelerometer(s), magnetometer(s), etc.) that may sense orientation and/or motion of the UE 280 and provide indications thereof that the one or more processors 210 (e.g., the general-purpose/application processor 230 and/or the DSP 231) may be configured to use to determine motion (e.g., a velocity vector and/or an acceleration vector) of the UE 280. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, and/or another component of the UE 280, and may be provided by hardware, software, firmware, or various combinations thereof.

Figure 3:
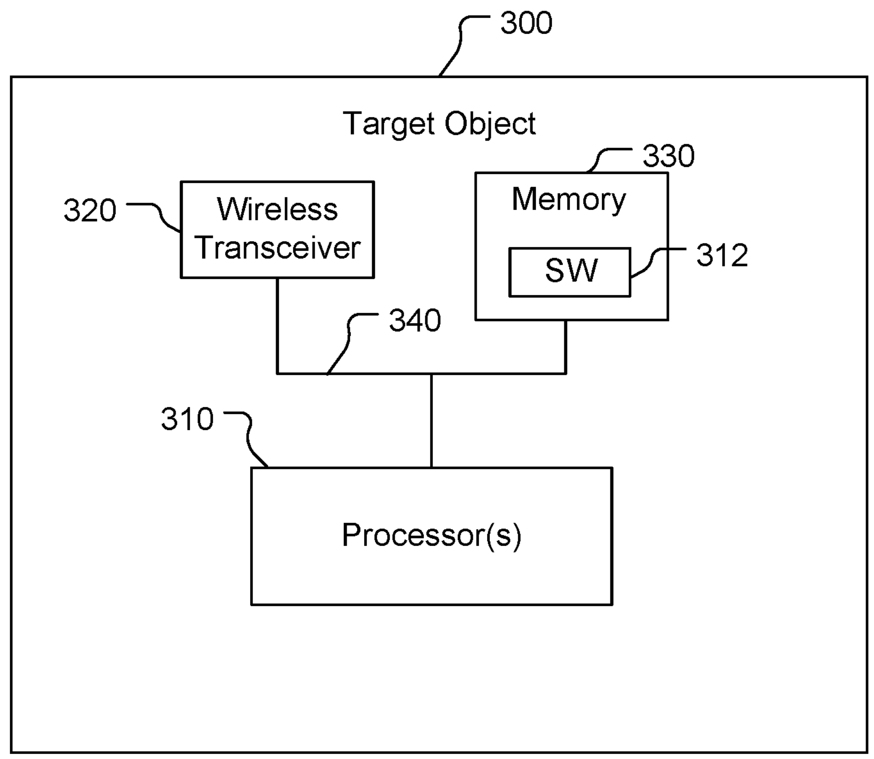
FIG. 3 illustrates an example of a target object.

FIG. 3 illustrates an example target object 300. The target object 300 may be an example of the target object 102. The target object 300 may comprise one or more processors 310, one or more memories 330 (possibly including SW 312), and one or more wireless transceivers 320, although any of these devices may be referred to in the singular (e.g., the processor 310) while including one or more of the respective devices. The one or more processors 310 and the one or more memories 330 may be communicatively coupled to each other by a bus 340 (which may be configured, e.g., for optical and/or electrical communication). The transceiver 320 may be configured for wireless communication using one or more RATs. For example, the transceiver 320 may be configured to wirelessly communicate with the transceiver 240 of the UE 200 using one or more RATs.

Figure 4:
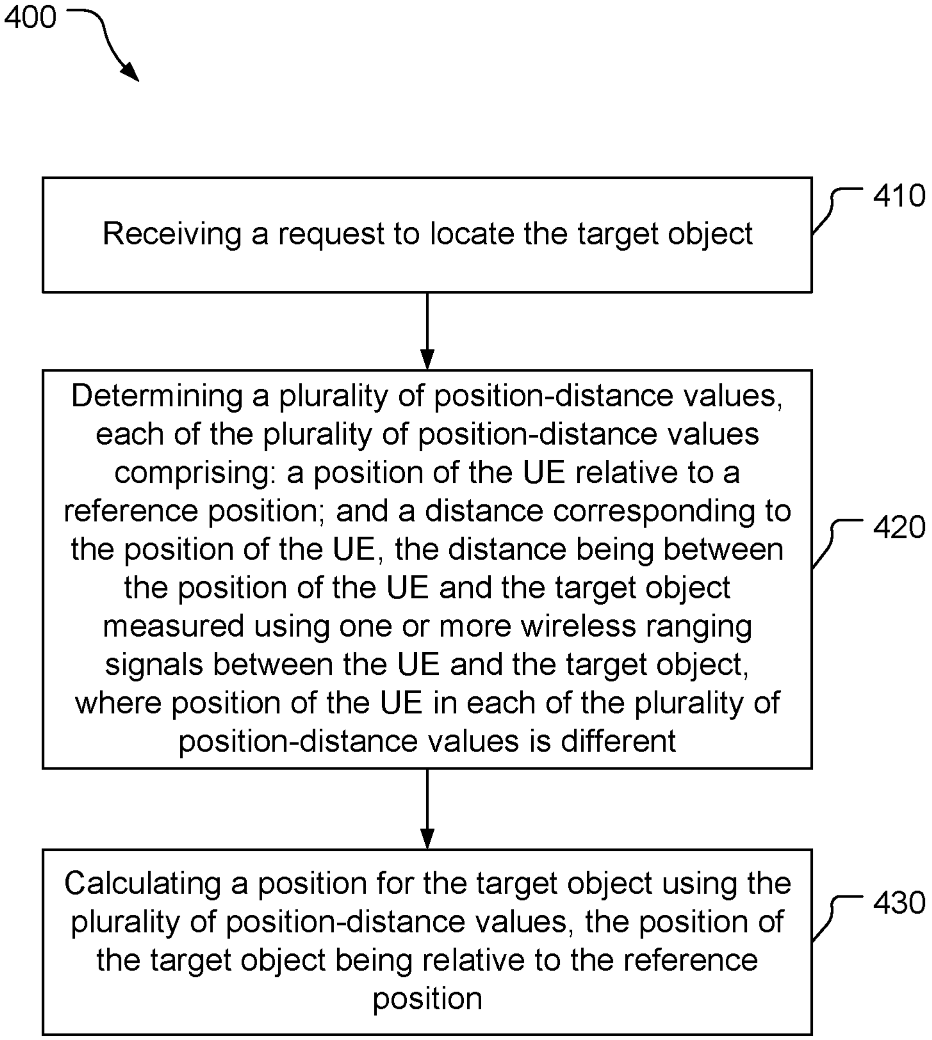
FIG. 4 shows a flow diagram of a method for determining a location of a target object.

FIG. 4 is a flow diagram of an example method 400 for determining a location of the target object 102. The method 400 includes receiving a request to locate the target object 102 (block 410). For example, a user input requesting to locate the object is received through the user interface of the UE 105. The one or more processors 210, possibly in combination with the one or more memories 211, in combination with the user interface 216 may comprise means for receiving the request. The method 400 includes determining a plurality of position-distance values (block 420). In an example embodiment, a message is sent through the user interface 216 to instruct a user of the UE 105 to move the UE 105 to different locations. Each of the position-distance values may comprise a position of the UE 105 relative to a reference position, and a distance corresponding to the position of the UE 105. The reference position may, for example, be a position of the UE 105, a position of another object or device, or a coordinate in three-dimensional space. The distance is between the position of the UE 105 and the target object 102 and is measured using one or more wireless ranging signals between the UE 105 and the target object 102. Each position of the UE 105 in the position-distance values is different. The positions that are different may be a subset of some, but not all, of the positions measured for the UE 105. For example, measured positions may include some measured positions that are the same and some measured positions that are different. The one or more processors 210, in combination with the one or more memories 211, may comprise means for determining the position of the UE 105.

An exchange of "wireless ranging signal", as used herein, refers to an exchange of radio signals that supports the ability to determine a distance between two transceivers, (e.g., the transceiver 240 of the UE 105 and the transceiver 320 of the target object 102). For example, the wireless transceivers 240, 320 may exchange signals according to the IEEE 802.11az WiFi®, Bluetooth®, or UWB protocols. For example, a time-of-flight (TOF) for the wireless ranging signal between the transceivers 240, 320 may be used to measure the distance between the UE 105 and the target object 102. For another example, a Received Signal Strength Indicator (RSSI) of the wireless ranging signal may be used to measure the distance between the UE 105 and the target object 102. For another example, a phase-based ranging that measures signal phase delay in the exchange of wireless ranging signals between the transceivers 240, 215 (e.g., Bluetooth® channel sounding) may be used to measure the distance between the UE 105 and the target object 102. The one or more processors 210, in combination with the one or more memories 211, in combination with the transceivers 240, 320, may comprise means for determining the distance between the position of the UE 105 and the target object 102.

The method 400 includes calculating a position for the target object 102 using the plurality of position-distance values, where the position of the target object 102 is relative to the reference position (block 430). The one or more processors 210, in combination with the one or more memories 211, may comprise means for calculating the position of the target object 102.

For example, referring to FIGS. 1 and 4, a position $\vec{x}=(x_0, y_0, z_0)$ of the target object 102 is unknown, i.e., the target object 102 is "lost". In response to receiving a request to locate the target object 102, the one or more processors 210 establish wireless communication between the wireless transceiver 240 of the UE 105 and the wireless transceiver 320 of the target object 102, where one or more wireless ranging signals according to the one or more RATs, are exchanged. A position $\vec{p_1}=(p_{x1}, p_{y1}, p_{z1})$ of the UE 105 is calculated corresponding to time $t_1$. This position $(x_1, v_1, z_1)$ of the UE 105 may be set as the reference position. At time $t_1$, a distance $r_1$ between the UE 105 and the target object 102 is measured using the wireless ranging signal(s) between the UE 105 and the target object 102. The position $\vec{p_1}$ and the distance $r_1$ are associated with each other as a position-distance value based on time $t_1$. A position, $\vec{p_2}=(p_{x2}, p_{y2}, p_{z2})$ of the UE 105 is calculated corresponding to time $t_2$, and a distance $r_2$ is measured, with $\vec{p_2}$ and $r_2$ forming a second position-distance value based on time $t_2$. A position, $\vec{p_3}=(p_{x3}, p_{y3}, p_{z3})$, of the UE 105 corresponding to time $t_3$ is calculated and a distance $r_3$ is measured, with $\vec{p_3}$ and $r_3$ forming a third position-distance value based on time $t_3$. As the UE 105 moves to different locations, the calculation of the position of the UE 105 and measurement of the corresponding distance from the UE 105 to the target object 102 is repeated. A position, $\vec{p_N}=(p_{xN}, p_{yN}, p_{zN})$, of the UE 105 corresponding to time $t_N$ is calculated and a distance $r_N$ is measured, with $\vec{p_N}$ and $r_N$ forming an $N^{th}$ position-distance value based on time $t_N$. Each of the positions of the UE 105, $\vec{p_2}, \vec{p_3}, \ldots, \vec{p_N}$, may be determined relative to the reference position $(x_1, y_1, z_1)$. The position $\vec{p_1}$. Each of the positions, $\vec{p_1}, \vec{p_2}, \vec{p_3}, \ldots, \vec{p_N}$, of the UE 105 may be determined by the PD 219, as described above with reference to FIG. 2B. The position $\vec{x}$ of the target object 102 may be calculated (e.g., by the processor(s) 210) using the position-distance values.

Figure 5:
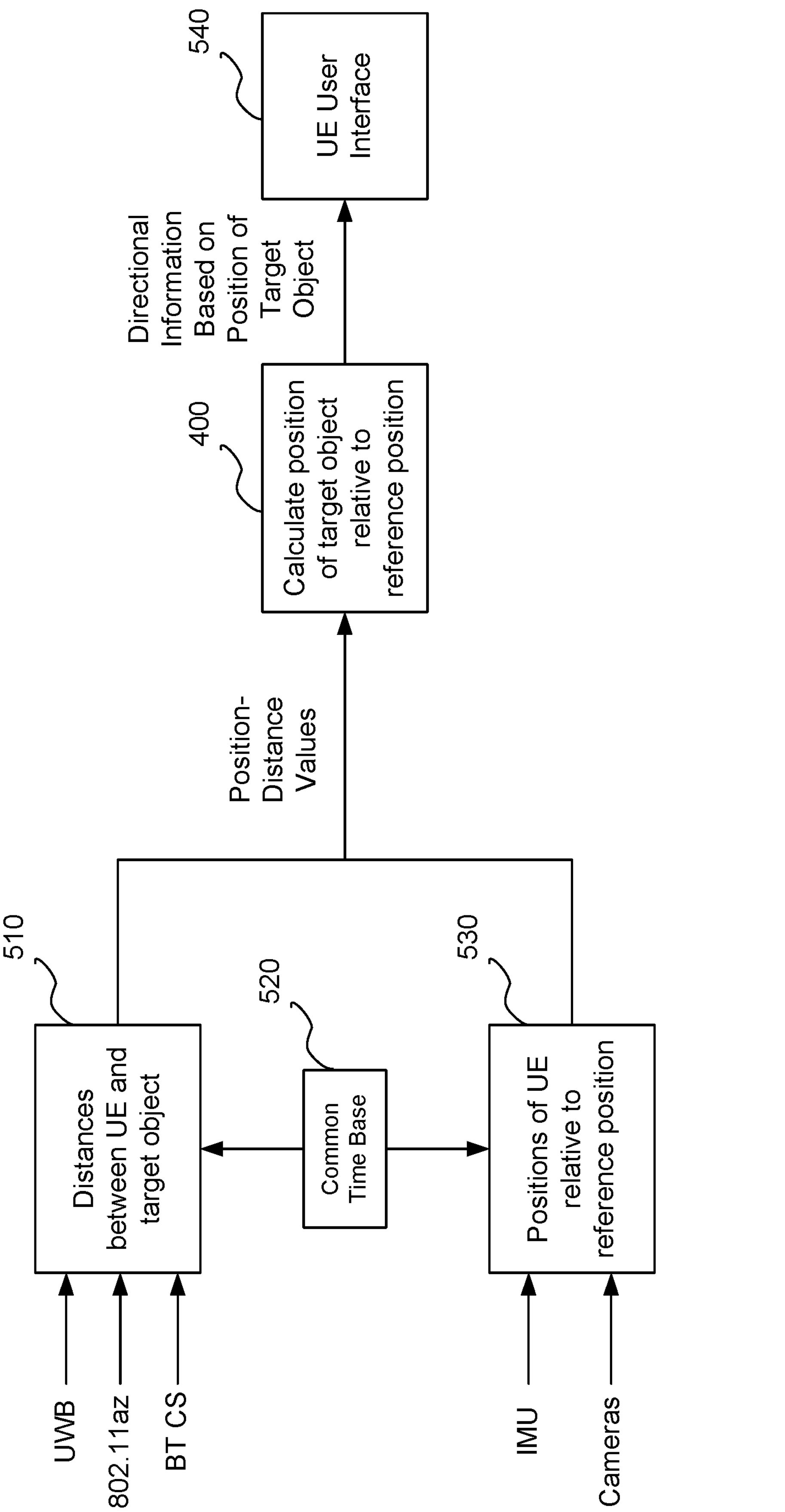
FIG. 5 illustrates an example information flow for determining and indicating a location of the target object.

FIG. 5 illustrates an example information flow for locating a target object. Dead-reckoning positions 530 of the UE 105, relative to the reference position, may be calculated by the PD 219 in conjunction with the one or more processors 210 and the one or more memories 211, using information from the sensor(s) 213. Images may be captured by the camera 218, and the information obtained from the processing of these images may be used in combination with the information from the sensor(s) 213 to determine the position of the UE 105, which may provide greater accuracy than without using images from the camera 218. Information determined from measuring the wireless ranging signals (e.g., UWB, 802.11az, BT Channel Sounding signals) exchanged between the UE 105 and the target object 102 may be used to measure the distances 510 between the UE 105 and the target object 102. Each distance 510 and position 530 correspond to each other according to a common time base 520 and together form a position-distance value. Multiple position-distance values may be processed (e.g., by the processor(s) 210) according to the method 400 to calculate the position of the target object 102 relative to the reference position. The processor(s) 210 may use the position of the target object 102 and the present position and orientation of the UE 105 to determine a direction of the target object relative to the UE 105. The processor(s) 210 may determine directional information, e.g., direction and distance of the target object 102 relative to the UE 105, and provide the directional information to a UE user interface 540 (e.g., user interface 216). The UE user interface 540 may provide one or more indications (e.g., one or more visual indications and/or one or more verbal indications) as to the direction and distance of the target object 102 relative to the UE 105.

In one example embodiment, the one or more processors on the UE 105, executing instructions/code stored in the one or more memories 211, implement the method 400. In another example embodiment, the UE 105 sends the position-distance values to a network computing device over a network connection for processing, where one or more processors of the network computing device, executing instructions/code stored on one or more memories of the network computing device, implement the method 400. In another example embodiment, the UE 105 sends the position-distance values to a local computing device, such as over a device-to-device wired or wireless connection, where one or more processors of the local computing device, executing instructions/code stored on one or more memories of the local computing device, implement the method 400. The one or more processors implementing the method 400 may return the position of the target object 102 to the UE 105.

Figure 6:
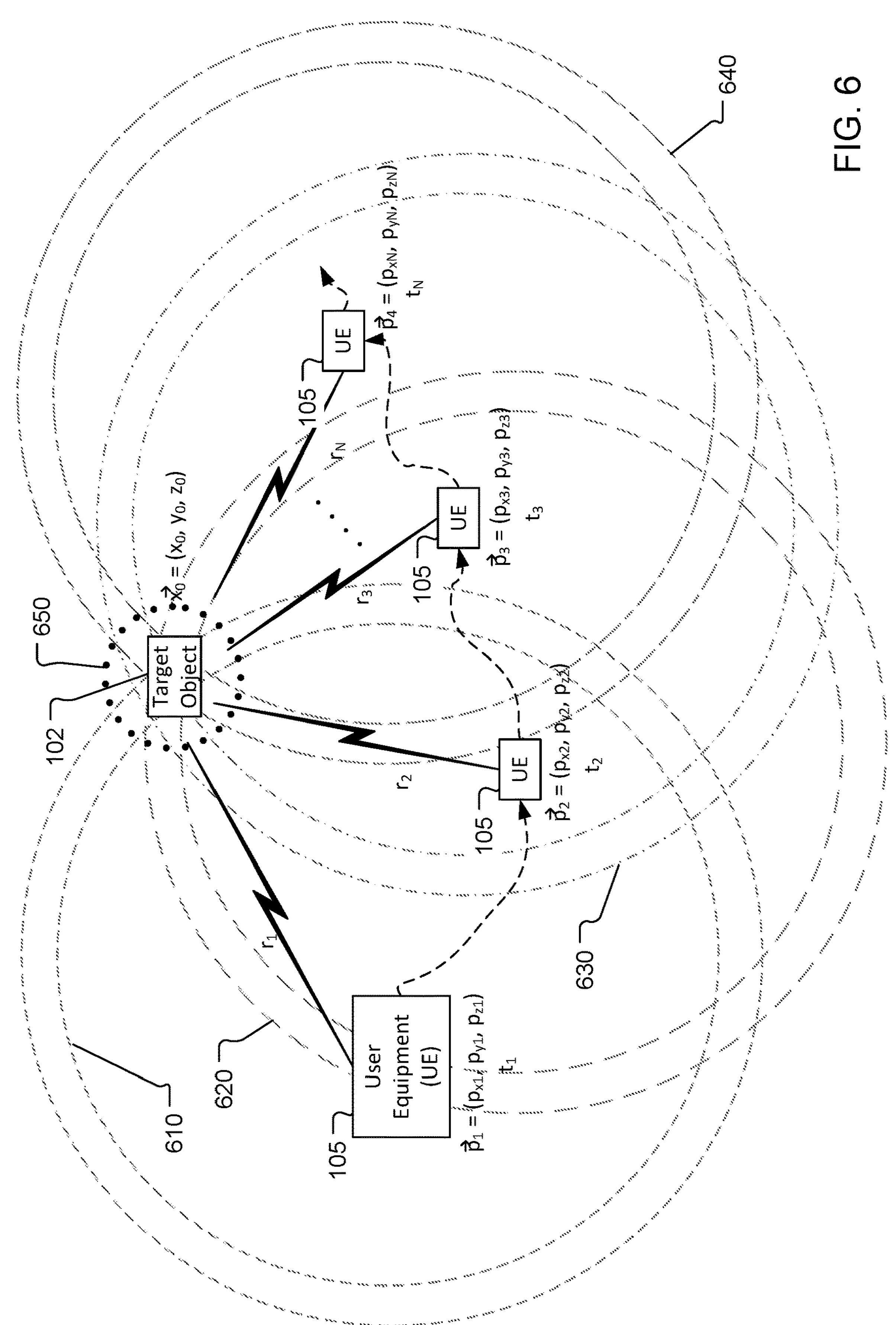
FIG. 6 shows a graphical representation of the calculation of the position of the target object.

FIG. 6 shows a graphical representation of a calculation of a position of the target object 102 using determined position-distance values. For each position-distance value, a sphere may be derived representing a three-dimensional space, where the position of the UE 105 is the center of the sphere and the corresponding distance is the radius of the sphere. For example, for position $\vec{p_1}$ and distance $r_1$, a sphere 610 represents the corresponding three-dimensional space, with FIG. 6 being of a plane passing through the sphere 610 (and other spheres discussed herein). For position $\vec{p_2}$ and distance $r_2$, a sphere 620 represents the corresponding three-dimensional space. For position $\vec{p}_3$ and distance $r_3$, a sphere 630 represents the corresponding three-dimensional space. For position $\vec{p}_N$ and distance $r_N$, a sphere 640 represents the corresponding three-dimensional space. Because the positions and distances may not be exact (e.g., have some error), the boundaries of each sphere 610, 620, 630, 640 may have a "thickness", i.e., the boundaries may be a range of values. The intersections of the spheres 610, 620, 630, 640 provide a three-dimensional space 650 within which the target object 102 is estimated to be located. As additional position-distance values are determined, and more spheres representing the corresponding three-dimensional spaces are added, the size of the space 650 may become smaller and thus the position estimate of the target object 102 may become more precise.

Figure 7:
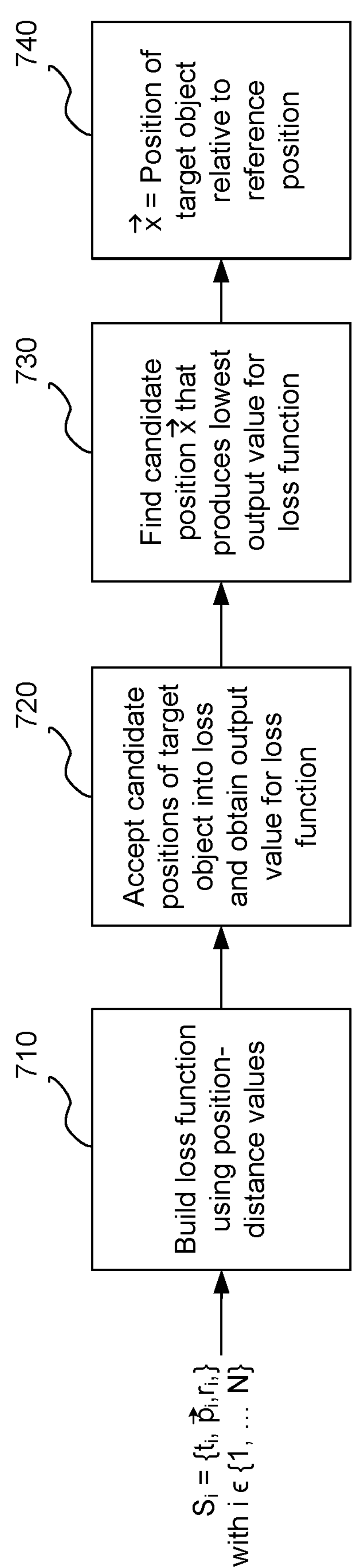
FIG. 7 illustrates an example of a calculation of the position of the target object.

FIG. 7 illustrates an example of a calculation of the position of the target object 102. The calculations illustrated with reference to FIG. 7 may be an example of the calculation illustrated in block 430 of FIG. 4. The one or more processors 210 may calculate N positions of the UE 105 (i.e., $\vec{p}_1$ $\{\vec{p}_1, \vec{p}_2, \vec{p}_3, \ldots, \vec{p}_N\}$, where $p_1$ is relative to the reference position. Each position $\vec{p}_1$ represents the position of the UE 105 in three-dimensional space (e.g., $\vec{p}_i=(p_{xi}, p_{yi}, p_{zi})$). The one or more processors 210 may measure distances (i.e., $r_i=\{r_1, r_2, r_3, \ldots, r_n\}$) between the positions $\vec{p}_1$ of the UE 105 and the target object 102 using one or more wireless ranging signals transferred between the UE 105 and the target object 102. Each distance $r_i$ corresponds to a position $\vec{p}_i$ and a time or a time period (i.e., $t_i=\{t_1, t_2, t_3, \ldots, t_n\}$). Each corresponding position $\vec{p}_i$ and distance $r_i$ forms a position-distance value $s_i=\{t_i, \vec{p}_i, r_i\}$. As illustrated in FIG. 7, the one or more processors 210 may use the position-distance values s; to build a loss function $\lambda(\vec{x})$ as an array of N samples (block 710):

$$s_i = \{t_i, \vec{p}_i, r_i\} \text{ with } i \in \{1, \ldots, N\},$$

where the elements of $s_i$ are as follows:

$t_i$=time at which the UE 105 is at position $\vec{p}_i$ and distance $r_i$ from the target object 102

$\vec{p}_i$=position of the UE 105, relative to the reference position, at time $t_i$ $r_i$=distance between the UE 105 and the target object 102 at time $t_i$ The one or more processors 210 accepts candidate positions into the loss function $\lambda(\vec{x})$ (block 720), finds a candidate position $\vec{x}$ that produces the lowest output value for the loss function (block 730) (i.e., minimizes the loss function), and determines the candidate position $\vec{x}$ as the position of the target object 102 relative to the reference position (block 740). The position $\vec{x}$ represents the position of the target object 102 in three-dimensional space (i.e., $\vec{x}=(x, y, z)$). For example, a gradient descent method may be used to minimize the loss function $\lambda(\vec{x})$ to calculate the value of $\vec{x}$. Gradient descent is an iterative process that computes a series of approximations of the position $\vec{x}$ of the target object 102 that gradually approach the solution. Each approximation is computed from the previous approximation. For time $t_i$, where the position of the UE 105 is $p_i=(p_x, p_y, p_z)$ and the position $\vec{x}$ of the target object 102 is (x, y, z), a distance $\rho_i$ may be given by:

$$\rho_i = \|\vec{x} - \vec{p}_i\| = \sqrt{(x-p_x)^2 + (y-p_y)^2 + (z-p_z)^2} \quad \text{(Eq. 1)}$$

A loss function for a single position-distance value may then be built:

$$\lambda_i(\vec{x}) = (\rho_i - r_i)^2 = (\|\vec{x} - \vec{p}_i\| - r_i)^2 \quad \text{(Eq. 2)}$$

A loss function for N position-distance values may be derived from Equation 2:

$$\lambda(\vec{x}) = \sum_{i=1}^{N} \lambda_i(\vec{x}) = \sum_{i=1}^{N} (\rho_i - r_i)^2 = \sum_{i=1}^{N} (\|\vec{x} - \vec{p}_i\| - r_i)^2 \quad \text{(Eq. 3)}$$

In an example embodiment, different weights may be applied to certain components of the loss function. When weights $q_i$ are applied, the loss function may be modified as follows:

$$\lambda(\vec{x}) = \sum_{i=1}^{N} \lambda_i(\vec{x}) = \sum_{i=1}^{N} q_i(\rho_i - r_i)^2 = \sum_{i=1}^{N} q_i(\|\vec{x} - \vec{p}_i\| - r_i)^2 \quad \text{(Eq. 4)}$$

One example weight is based on the radio type. Different wireless ranging signals provide different levels of accuracy in the measurement of the distance between the UE 105 and the target object 102. For example, a signal from a UWB radio can provide a higher accuracy measurement than a signal from a Bluetooth® radio. When different distances are measured using different radio types, the distances measured using signals from higher accuracy radio types may be given greater weight than distances measured using signals from lower accuracy radio types. The weight $q_i$ may be based on modeled standard deviations σ of measurement errors for each radio type. For example, if the $i^{th}$ measurement is taken using a UWB radio, and the $j^{th}$ measurement is taken using a Bluetooth® radio, where $\sigma_i < o_j$, then $q_i$ may be calculated such that greater weight is applied to the $i^{th}$ measurement than to the $j^{th}$ measurement. The standard deviation σ for specific transceiver types may be pre-calculated, possibly in combination with other operating parameters, such as frequency. Below is an example lookup table with illustrative values of σ for transceiver types and operating parameters:

| Radio type | σ |
|---|---|
| Type A | 10 cm |
| Type B | 100 cm |
| Type C (20 MHz) | 800 cm |
| Type C (40 MHz) | 400 cm |
| Type C (80 MHz) | 200 cm |

For a position of the target object $\vec{x}$, the difference between $\rho_i$ (Eq. 1) and $r_i$ is normalized by the standard deviation of $r_i$, by redefining the loss function $\lambda_i(\vec{x})$ as follows:

$$\lambda_i(\vec{x}) = \left(\frac{\rho_i - r_i}{\sigma_i}\right)^2 = \frac{1}{\sigma_i^2}(\rho_i - r_i)^2 \quad \text{(Eq. 5)}$$

In this example, $$q_i = \frac{1}{\sigma_i^2}.$$

The relative contribution of the UWB measurement to the loss function will be larger than for the Bluetooth® measurement. Applying weights in this manner allows for the combination of measurements from different radio types with different levels of accuracy. For example, a first radio type with longer range may be initially used, and a change to a second radio type with a shorter range may occur later. By applying weights as described above, previous distance measurements using the first radio type need not be discarded. Measurements from both the first and second radio types may be used.

Different weights may also be applied to different distance measurements by the same radio type based on one or more other parameters. For example, different measurements from the same radio type can have different standard deviations σ depending on the distance between the UE 105 and the target object 102, where the larger the distance, the greater the value of the standard deviation σ. The weight $q_i$ may be calculated such that a smaller weight is applied to measurements taken at greater distance than measurements taken at a lesser distance. For example, the value of σ may be applied using a lookup table or computed as a function of r as follows:

$$\sigma = f(r), \quad \text{(Eq. 6)}$$

where the function $f(\ )$ varies depending on the specific operational parameters of the radio type.

Another example weight dependency is based on time of measurement. Measurements by the components of the UE 105, such as the IMU 270, the camera 218, etc., contain errors that may gradually increase over time. The larger the time difference between a time of a position measurement and a time of the reference position, the less accurate the position measurement is likely, and may be assumed, to be. The standard deviation σ of the error may thus increase with time difference. The weight $q_i$ may be calculated such that a smaller weight is applied to later measurements than to earlier measurements. A formula for the weight $q_i$ may be based on a model of the source(s) of error in the measurements. For example, when the standard deviation σ of the error increases exponentially with time, a possible equation for $q_i$ may be:

$$q_i = \exp\left\{-\frac{t_N - t_i}{\tau}\right\}, \quad \text{(Eq. 7)}$$

where τ is a derived time constant. When position errors accumulate quickly, τ will have a smaller value than when position errors accumulate more slowly.

Another example weight dependency is based on a speed of movement of the UE 105. The UE 105 may move with varying speed. For example, some measurements may be taken with the UE 105 almost static while other measurements may be taken while the UE 105 is moving, e.g., while being shaken. The speed of movement of the UE 105 may affect the accuracy of the UE position $\vec{p}_i$. The weight $q_i$ may be calculated based on the standard deviation σ of the measurement of position $\vec{p}_i$, such that measurements taken with a faster movement speed of the UE 105 are given lesser weight than measurements taken with a slower movement speed of the UE 105. For example, the standard deviation σ of the UE position measurement may be proportional to an instantaneous speed of the UE 105 when the measurement was taken. An example implementation of the weight $q_i$ may be:

$$q_i = \frac{1}{\sigma_r^2 + \sigma_v^2} \quad \text{(Eq. 8)}$$

where $\sigma_r$ is the standard deviation for the TOF measurement, and $\sigma_v$ is proportional to the speed of the UE 105 at time $t_i$.

Another example weight dependency is based on the movement of the target object 102. For example, if the target object 102 is able to detect movement of the target object 102, such as being configured with sensors similar to sensor(s) 213, the information (e.g., from the sensors) of the movement may be used to calculate the weight $q_i$. For example, if, after the measurement of the initial position-distance value, the target object 102 detects that the target object 102 has moved, the target object 102 may send a signal to the UE 105 to indicate the movement. In response, a smaller weight $q_i$ may be applied to measurements taken before the movement. The measurements taken before the movement may be discarded by applying a weight $q_i=0$.

Another example weight dependency is based on the wireless ranging signal strength. A radio may be configured with one or more mechanisms to determine the accuracy of measurements taken by the radio. For example, a radio may be configured with a mechanism to measure the degree of signal multipath in a physical environment. This information can be used to estimate the standard deviation $\sigma_i$ of the measurements taken by the radio. For another example, a transceiver may be configured to use a Received Signal Strength Indicator (RSSI) to perform an estimation of $\sigma_i$. The weight $q_i$ may be calculated such that a smaller weight is applied to signals with a larger $\sigma_i$. For example, the value of the weight $q_i$ may be calculated as:

$$q_i = \frac{1}{\sigma_i^2} \quad \text{(Eq. 9)}$$

In another embodiment, the weight $q_i$ is based on a combination of one or more factors, where the standard deviations σ of the factors are combined in the calculation of the weight $q_i$. For example, each measurement may comprise multiple sources of uncertainty, such as variance in the TOF measurements, variance in the position of the UE 105, time delay, etc. These effects can be combined to calculate a weight $q_i$ as follows:

$$q_i = \frac{1}{\sigma_r^2 + \sigma_v^2} \exp\left\{-\frac{t_N - t_i}{\tau}\right\} \quad \text{(Eq. 10)}$$

In one example, the weights $q_i$ are precalculated and used as inputs during performance of the method 400 along with the position-distance values. In another example, operational parameter values, such as radio type, frequency, etc., are used as inputs for the method 400, and the weights $q_i$ are calculated (e.g., by the processor(s) 210) by during performance of the method 400.

In one example embodiment, in calculating the position of the target object 102 (block 430 of FIG. 4), the reference position may be updated, such as to a more recent UE position. Updating the reference position to a more recent UE position may result in a more accurate determination of the location of the target object 102. For example, after calculating a first position of the target object 102 in a first iteration of blocks 420 and 430 of method 400, the one or more processors 210 may calculate a second position of the target object 102 in a second iteration of blocks 420 and 430. In the second iteration, the one or more processors 210 may update the reference position to a more recent UE position (e.g., a position that the UE 105 travels to after the calculation of the first position) and use the more recent UE position to calculate the second position of the target object 102, as described with reference to FIG. 8.

Figure 8:
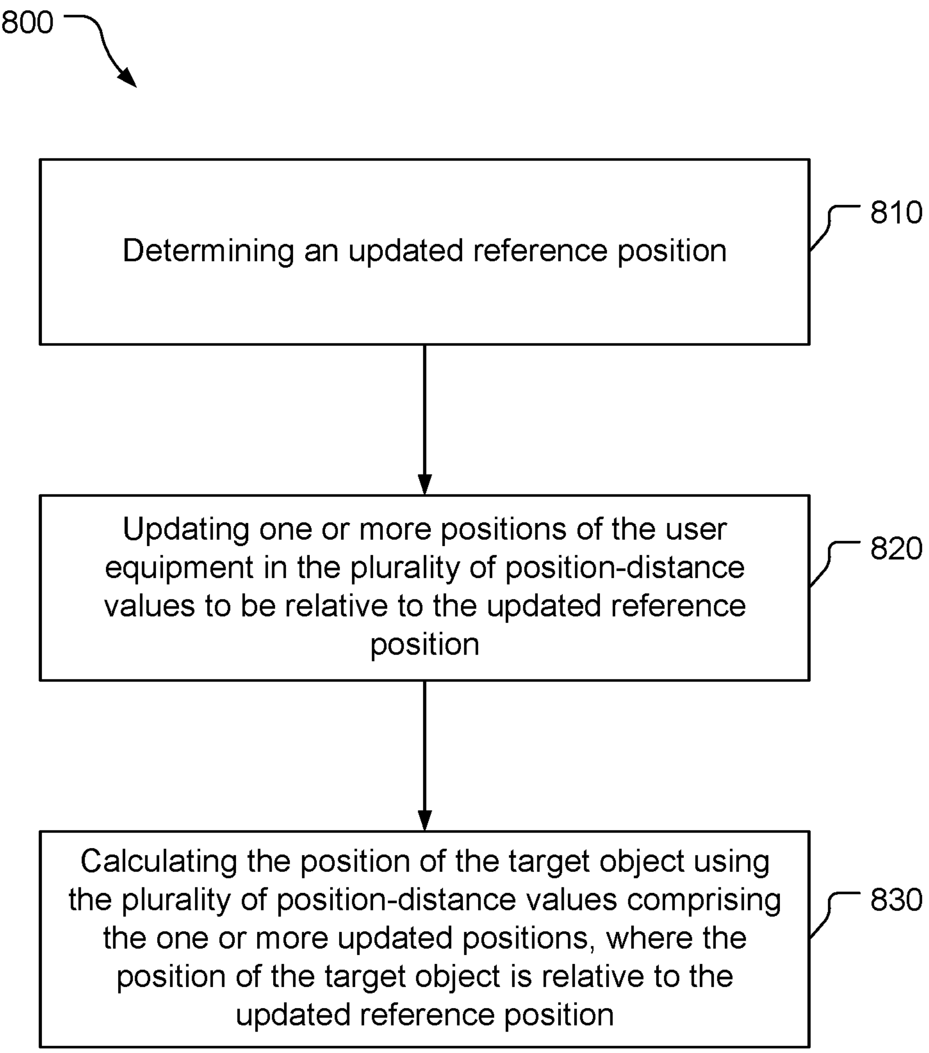
FIG. 8 shows a flow diagram of a method for updating of the reference position in the calculation of a position of the target object.

FIG. 8 shows a flow diagram of a method 800 for updating of the reference position in the calculation of a position of the target object 102. The one or more processors 210 may determine an updated reference position of the UE 105 (block 810). The one or more processors 210 may update one or more positions of the UE 105 in the plurality of position-distance values to be relative to the updated reference position (block 820). The one or more processors 210 may calculate the position of the target object 102 using the plurality of position-distance values comprising the one or more updated positions, where the position of the target object 102 is relative to the updated reference position (block 830). The one or more processors 210, in combination with the one or more memories 211, may comprise means for implementing blocks 810-830.

The one or more processors 210 may update the position of the UE 105 at a variety of times. The current position of the UE 105 may be $\vec{p}_N$, the position at the time that the position of the target object 102 is output. The method 800 includes updating the reference position to the current position $\vec{p}_N$ of the UE 105 and recalculating the one or more of the positions $\vec{p}_i$ to be relative to the updated reference position $\vec{p}_N$. The position $\vec{x}$ of the target object 102 may be calculated according to the method 400 using the samples $s_i$ that includes the updated $\vec{p}_i$, where the position $\vec{x}$ of the target object 102 is relative to $\vec{p}_N$.

Figure 9:
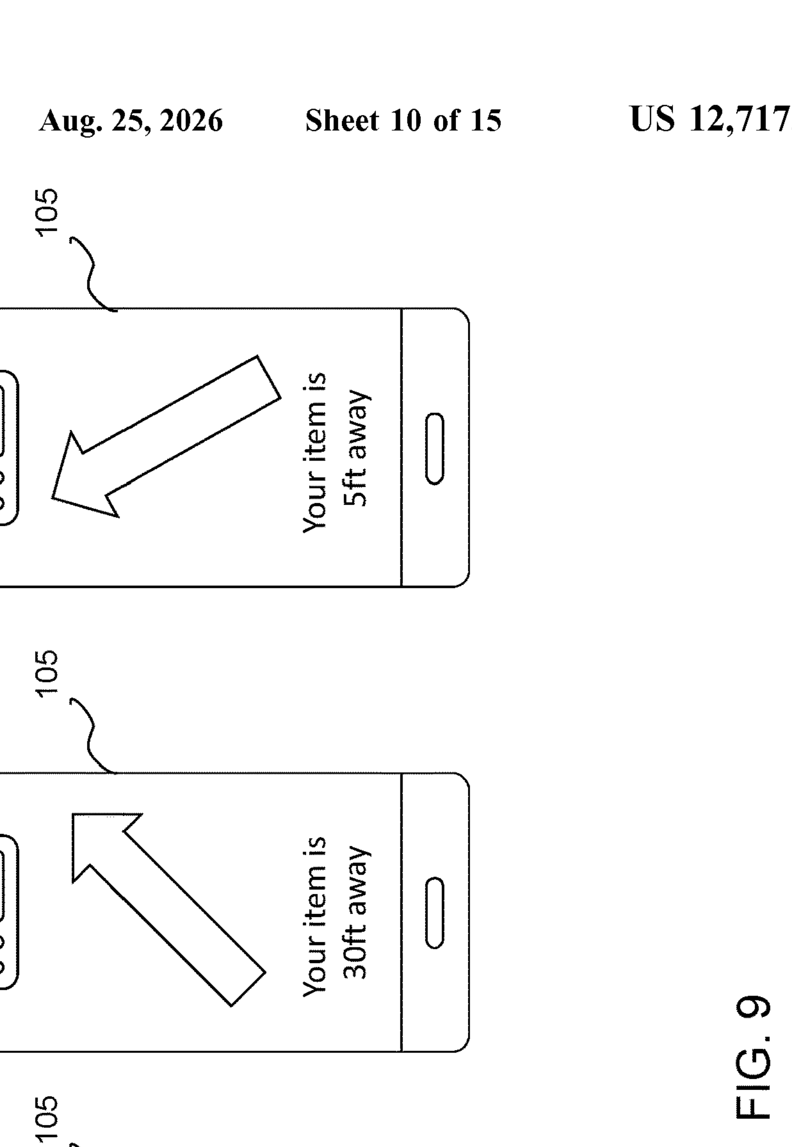
FIG. 9 illustrates an example user experience in locating the target object.
Figure 9:
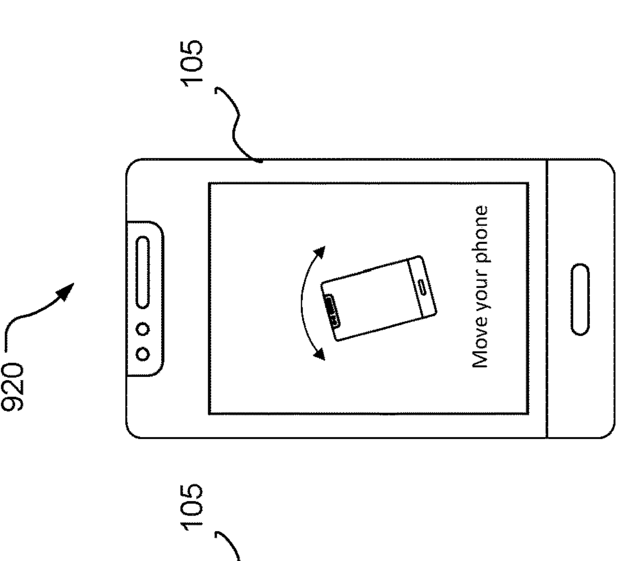
Figure 9:
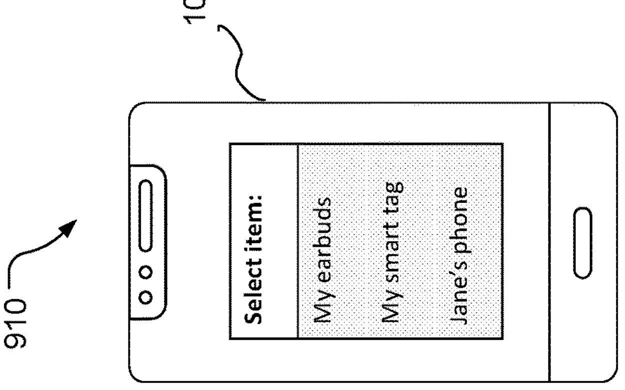

FIG. 9 illustrates an example user experience in locating the target object 102, e.g., using embodiments of the method 400. In this example, the UE 105 is a mobile device with one or more processors (e.g., the processor(s) 210) executing an application (e.g., the software 212) stored in one or more memories (e.g., the memories 211). A user of the UE 105 executes the application, and the application displays an image 910, on the user interface of the UE 105, that provides a list of items that support wireless ranging signals. The user selects one of the items as the target object 102. In response to receiving the selection of the target object 102, the application executing on the UE 105 causes a communication link between the transceivers of the UE 105 and the target object 102 to be established (e.g., between the transceivers 240, 320). The application displays an image 920 on the user interface with instructions for the user to move the UE 105. As the UE 105 moves to different locations, the application executes the method 400 as described above, including calculating the position of the target object 102. The application causes directional information to be displayed on the user interface as an image 930 based on the position of the target object 102 and the orientation of the UE 105. As the user continues to move the UE 105, the position of the target object 102 is updated. The application displays updated directional information in an image 940 based on the updated position of the target object 102 and an updated orientation of the UE 105.

Figure 10:
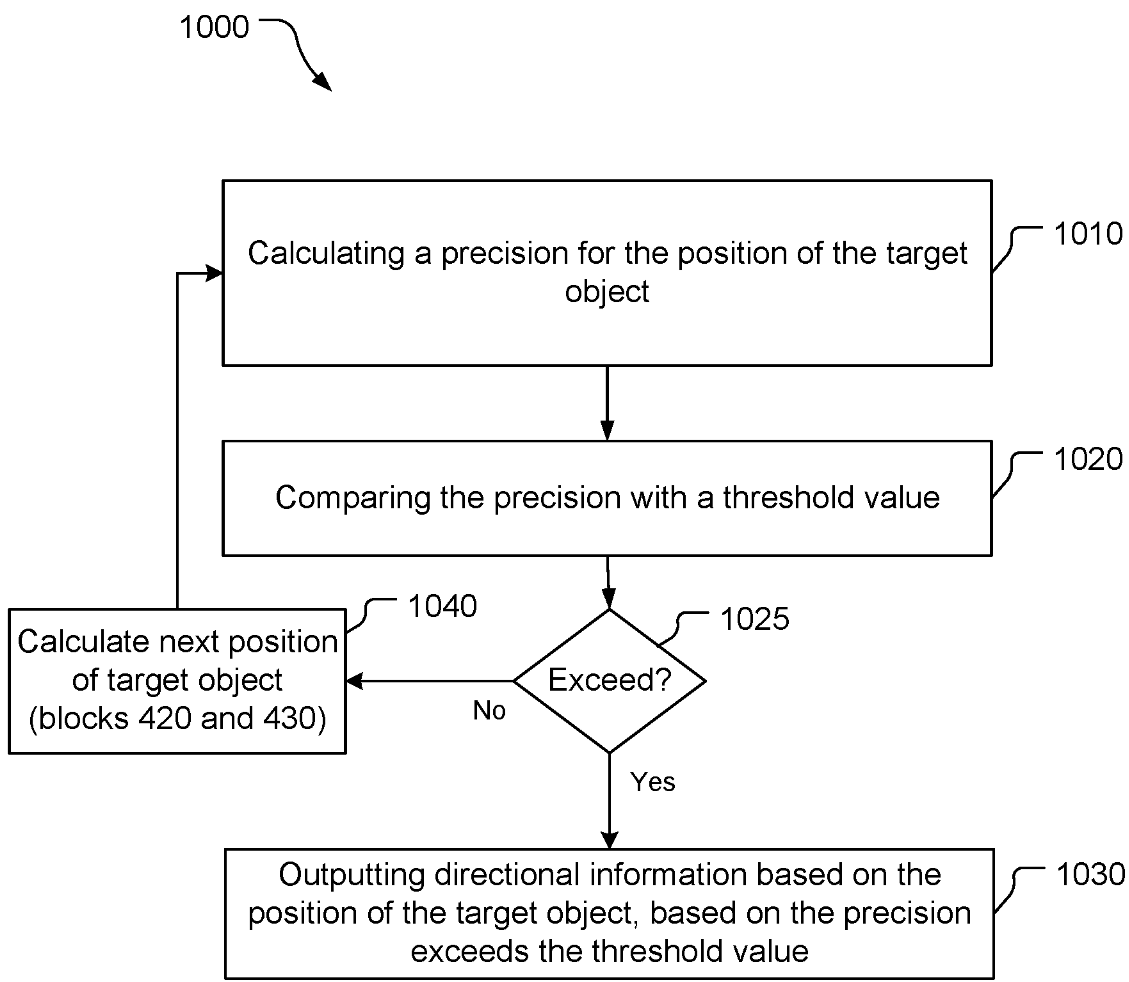
FIG. 10 shows a flow diagram of a method for selectively providing directional information to the user.

In an example embodiment, the method 400 includes determining whether the estimated position of the target object 102 is sufficiently reliable to provide the directional information to the user. As described above with reference to FIG. 6, the positions, and distances in the position-distance values may not be exact. As more position-distance values are determined, the position of the target object 102 may become more precise. For example, each distance r may have a known standard deviation σ. FIG. 10 shows a flow diagram for a method 1000 for selectively providing directional information to the user. The method 1000 may include calculating a precision for the position of the target object 102 (block 1010). An example of the calculation of the precision is described further below. The method 1000 may include comparing the precision with a threshold value (block 1020). The threshold value represents a desired precision of the position of the target object 102. If the precision exceeds (block 1025) the threshold value, then the method 1000 may include outputting directional information based on the position of the target object 102 (block 1030) (e.g., images 930, 940). For example, the directional information may be sent from the UE 105 to another entity (e.g., a server), may be transferred from one portion of the UE 105 to another portion of the UE 105, and/or provided to the user interface 216 and output from there to a user as one or more visual prompts and/or one or more audible prompts. If the threshold value is not exceeded, then blocks 420 and 430 (FIG. 4) are repeated (block 1040) to calculate a next position of the target object at least until the threshold value is exceeded or another condition is met, e.g., a number of position-distance values are determined or upon an expiration of a time period.

Figure 11:
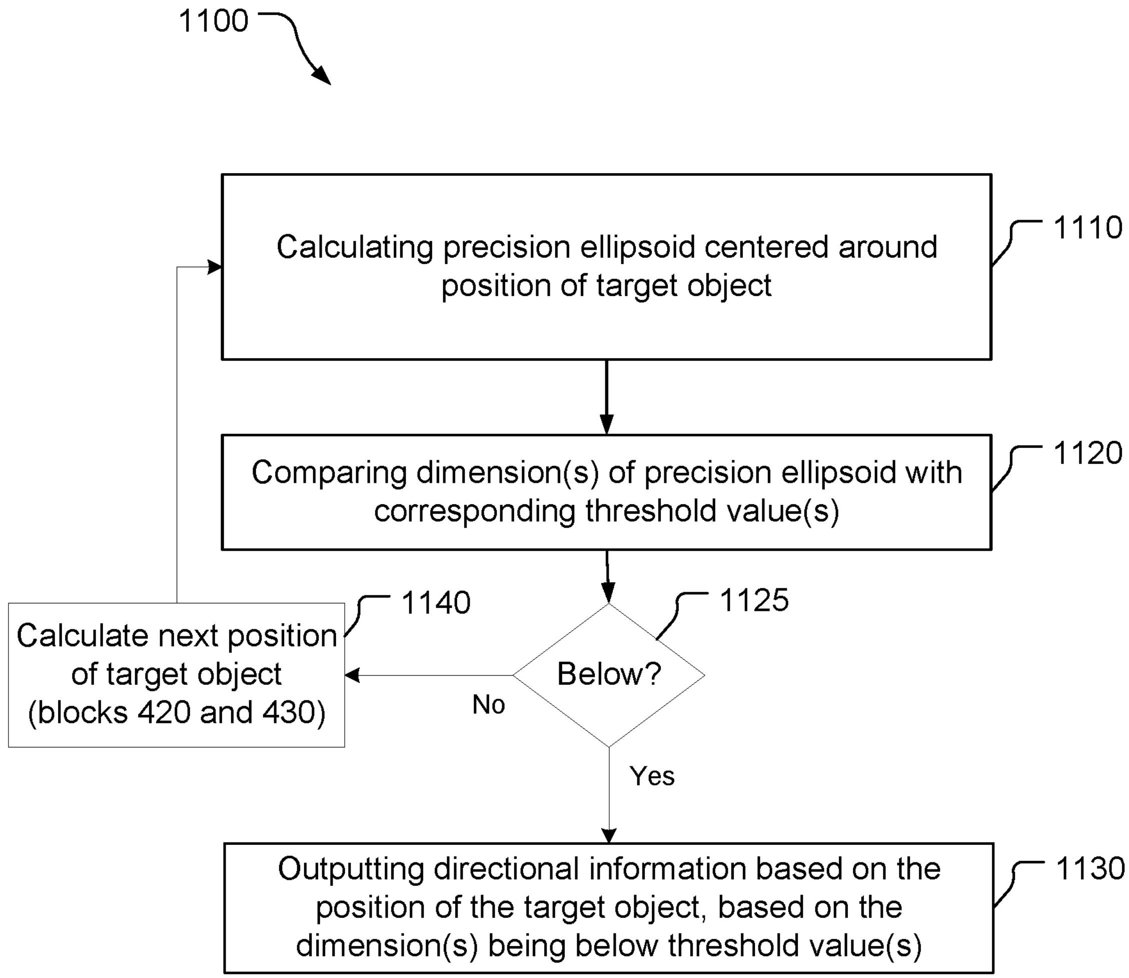
FIG. 11 shows a flow diagram of a method for calculating an absolute precision for a position of the target object.

Two example measurements of precision for a determined position of the target object 102 include absolute precision and directional precision. As used herein, absolute precision refers to a precision determined for an individual coordinate of the position of the target object 102. Directional precision, as used herein, refers to a precision determined for a directional angle from the UE 105 to the target object 102. FIG. 11 shows a flow diagram of a method 1100 for calculating an absolute precision for a position of the target object 102. The method 1100 may include the calculation of a precision ellipsoid centered around a position of the target object 102 (block 1110), with the position of the target object

Figure 12:
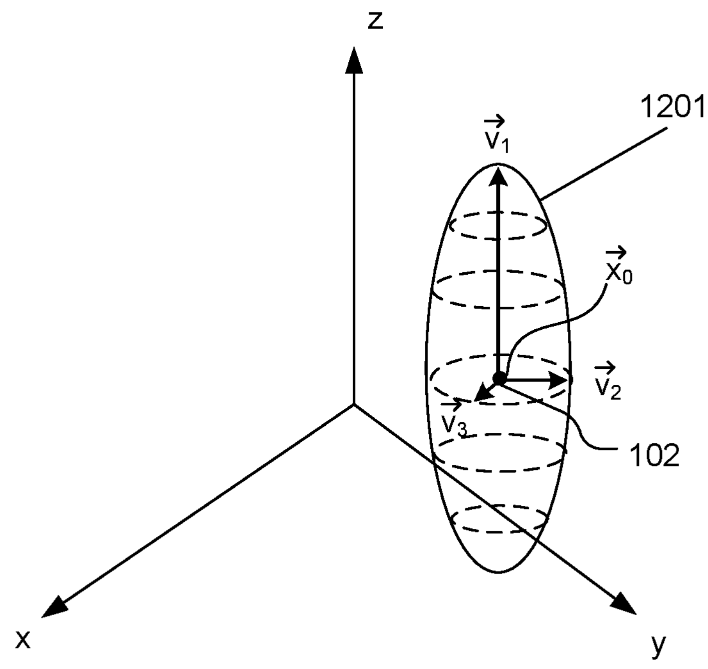
FIG. 12 illustrates an example precision ellipsoid centered around a position of the target object.

102 calculated as described above with reference to blocks 420 and 430 of FIG. 4. FIG. 12 illustrates an example precision ellipsoid 1201 centered around a position $\vec{x}$ of the target object 102.

A dimension of the precision ellipsoid in each direction indicates the confidence for the position $\vec{x}$ in each respective direction. The smaller the precision ellipsoid, the higher the confidence of the position $\vec{x}$. Returning to FIG. 11, the method 1100 may include comparing the dimensions of the precision ellipsoid in one or more directions with one or more corresponding threshold values (block 1120). For example, the threshold values may be configured to be 1 meter along the x-axis, 4 meters along the y-axis, and 10 meters along the z-axis. If the dimension(s) of the precision ellipsoid in the direction(s) is (are) below the corresponding threshold value(s) (as determined at block 1125), then directional information based on the position of the target object 102 may be output (block 1130). If the dimension(s) of the precision ellipsoid in the direction(s) is (are) not below the corresponding threshold value(s), then the calculation of the next position of the target object 102 (as described above with reference to blocks 420) and 430 of FIG. 4), the calculation of the precision of the next position, and the comparison of dimension(s) of the precision ellipsoid (as described with reference to blocks 1110) and 1120) are repeated. The one or more processors 210, in combination with the one or more memories 211, may comprise means for implementing blocks 1110, 1120, 1125, 1130, 1140.

Referring again to FIG. 12, illustrated is an example precision ellipsoid 1201 with the loss function $\lambda(\vec{x})$ operating in three dimensions, i.e., a three-dimensional loss function $\lambda(\vec{x})$. Plotting of the three-dimensional loss function $\lambda(\vec{x})$ centered around the target position would require drawing in four dimensions. Instead of attempting to represent the precision with a four-dimensional plot, a three-dimensional plot of a precision ellipsoid 1201 centered around the position $\vec{x}$ of the target object 102 is used instead to represent the precision of the position $\vec{x}$. The shape of the precision ellipsoid 1201 may be given by eigenvectors/eigenvalues of a Hessian $H_\lambda$ of the three-dimensional loss function $\nabla^2\lambda(\vec{x})$:

$$\mathcal{H}_\lambda = \nabla^2\lambda(\vec{x}) = \begin{pmatrix} \lambda_{xx} & \lambda_{xy} & \lambda_{xz} \\ \lambda_{yx} & \lambda_{yy} & \lambda_{yz} \\ \lambda_{zx} & \lambda_{zy} & \lambda_{zz} \end{pmatrix} = \begin{pmatrix} \frac{\partial^2\lambda}{\lambda x^2} & \frac{\partial^2\lambda}{\partial x\partial y} & \frac{\partial^2\lambda}{\partial x\partial z} \\ \frac{\partial^2\lambda}{\partial y\partial x} & \frac{\partial^2\lambda}{\partial y^2} & \frac{\partial^2\lambda}{\partial y\partial z} \\ \frac{\partial^2\lambda}{\partial z\partial x} & \frac{\partial^2\lambda}{\partial z\partial y} & \frac{\partial^2\lambda}{\partial z^2} \end{pmatrix} \quad \text{(Eq. 11)}$$

In this example, the Hessian $H_\lambda$ has three perpendicular, normalized eigenvectors $\vec{v}_1$, $\vec{v}_2$, and $\vec{v}_3$, with eigenvalues $\alpha_1$, $\alpha_2$, and $\alpha_3$, respectively. The semiaxes of the precision ellipsoid 1201 are given by the directions of the eigenvectors $\vec{v}_1$, $\vec{v}_2$, and $\vec{v}_3$. The behavior of the loss function $\lambda(\vec{x})$ in the vicinity of the position $\vec{x}$ of the target object 102 may be estimated using the Hessian $H_\lambda$. The Taylor expansion for the loss function $\lambda(\vec{x})$ near any point $\vec{x}_0$ is given by:

$$\lambda(\vec{x}) \approx \lambda(\vec{x_0}) + \nabla\lambda(\vec{x_0})(\vec{x}-\vec{x_0}) + \frac{1}{2}(\vec{x}-\vec{x_0})^T\nabla^2\lambda(\vec{x})(\vec{x}-\vec{x_0}) \quad \text{(Eq. 12)}$$

At the position $\vec{x}$ of the target object 102 at which the loss function $\lambda(\vec{x})$ is a minimum, the gradient of the three-dimensional loss function $\nabla\lambda(\vec{x})=0$, and the behavior of the loss function $\lambda(\vec{x})$ around the position $\vec{x}$ is given by:

$$\lambda(\vec{x}) \approx \lambda(\vec{x_0}) + \frac{1}{2}(\vec{x}-\vec{x_0})^T\nabla^2\lambda(\vec{x})(\vec{x}-\vec{x_0}) \quad \text{(Eq. 13)}$$

The behavior of the loss function $\lambda(\vec{x})$ around the position $\vec{x}_0$ can be understood by analyzing the Hessian $\mathcal{H}_\lambda$. As a result of the analysis, the precision $\sigma_1$ in the direction of the eigenvector $\vec{v}_1$ can be given by:

$$\sigma_1 = \frac{1}{\sqrt{\alpha_1}} \quad \text{(Eq. 14)}$$

Similarly, the precisions $\sigma_2$ and $\sigma_3$ in the directions of the eigenvectors $\vec{v}_2$, and $\vec{v}_3$, respectively may be given by:

$$\sigma_2 = \frac{1}{\sqrt{\alpha_2}} \quad \text{(Eq. 15)}$$

and $$\sigma_3 = \frac{1}{\sqrt{\alpha_3}} \quad \text{(Eq. 16)}$$

Figure 13:
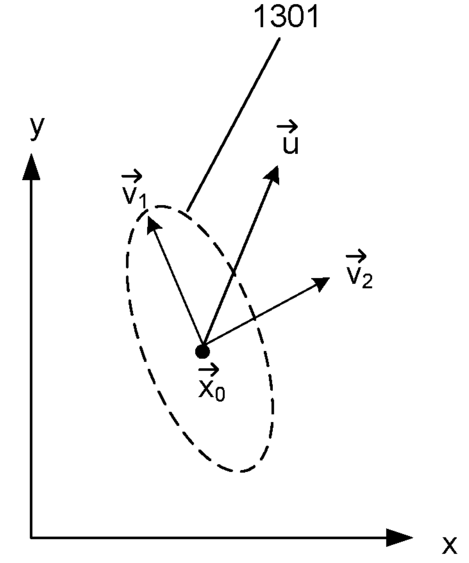
FIG. 13 illustrates an example precision ellipse in an arbitrary direction for a position of the target object.

Geometrically, the precision ellipsoid 1201 centered around the position $\vec{x}_0$ may be characterized as having semiaxes given by $\sigma_1$, $\sigma_2$, and $\sigma_3$. The directions with larger values of $\sigma$ have a lower precision (i.e., the ellipsoid is "wider") than directions with smaller values of $\sigma$ (i.e., the ellipsoid is "narrower"). In an example embodiment, the directional information output per block 1130 may include a graphical representation of the precision ellipsoid. Referring to FIG. 13, the precision $\sigma_{\vec{u}}$ for the position $\vec{x}_0$ (represented by the precision ellipse 1301) in an arbitrary direction $\vec{u}$ may be determined using:

$$\lambda(\vec{x_0} + \epsilon\cdot\vec{u}) \approx \lambda(\vec{x_0}) + \frac{1}{2}\epsilon^2\cdot\vec{u}^T\cdot\mathcal{H}_\lambda\cdot\vec{u} = \lambda(\vec{x_0}) + \frac{1}{2}\left(\frac{\epsilon}{\sigma_{\vec{u}}}\right)^2 \text{ where } \sigma_{\vec{u}} = \frac{1}{\sqrt{\vec{u}^T\cdot\mathcal{H}_\lambda\cdot\vec{u}}} \quad \text{(Eq. 17)}$$

Figure 14:
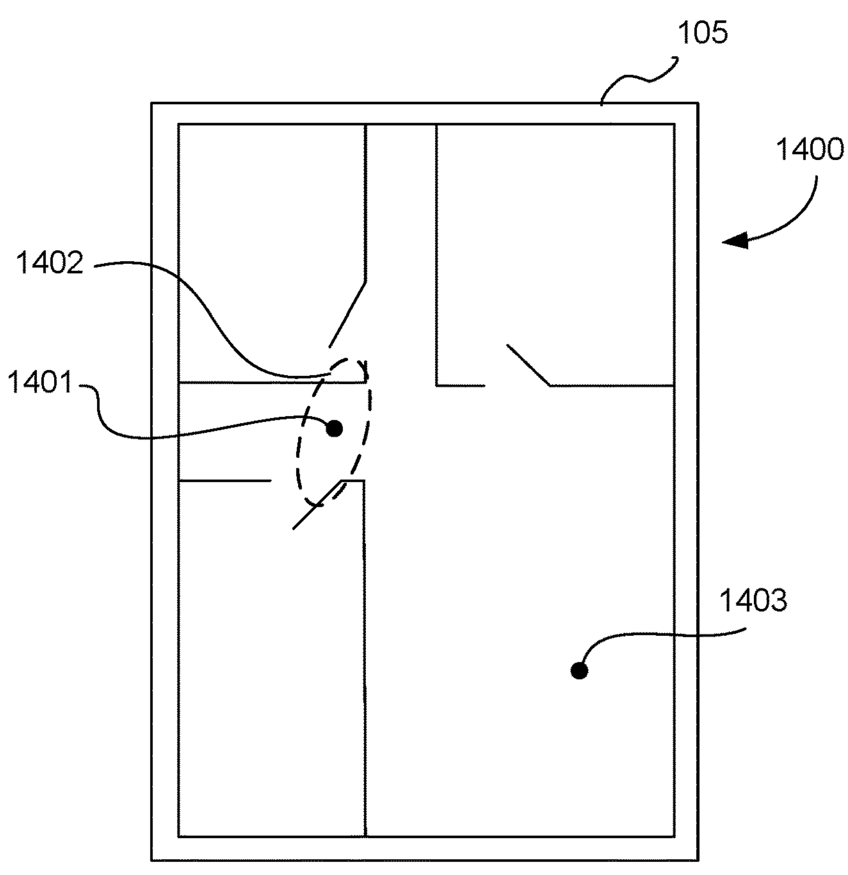
FIG. 14 illustrates an example display of a position of the target object with a representation of a precision ellipsoid or precision ellipse.

As illustrated in FIG. 14, an application execution on the UE 105 may display a map 1400 with an indication 1401 of the calculated position of the target object 102 and a representation 1402 of the precision ellipsoid 1201 or precision ellipse 1301. Optionally, an indication 1403 of the location of the UE 105 may also be displayed.

Figure 15:
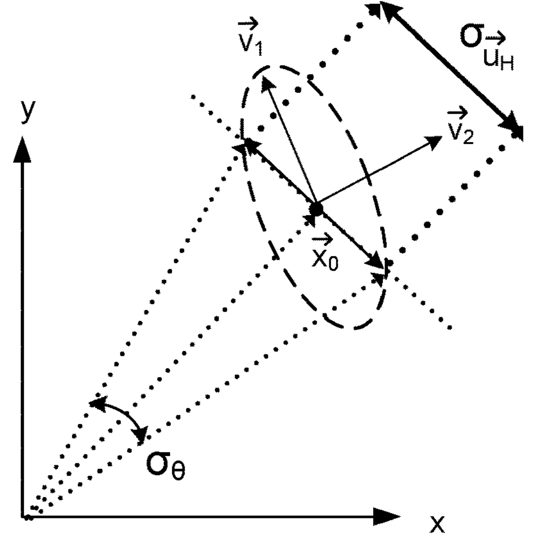
FIG. 15 illustrates an example angular precision for a position of the target object.
Figure 16:
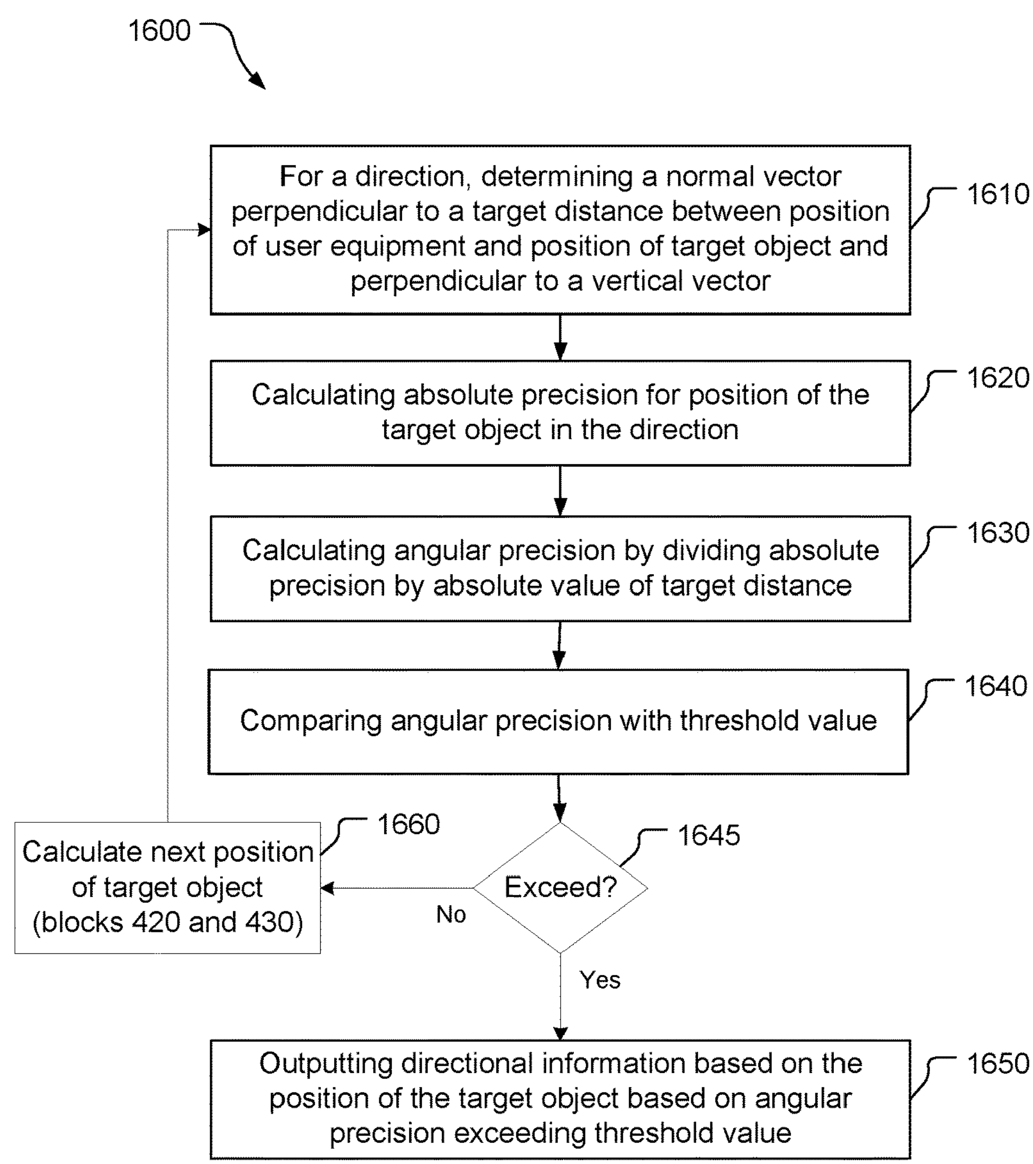
FIG. 16 shows a flow diagram of a method for calculating an angular precision for a position of the target object.

Referring to FIG. 15, a direction or angular precision in an arbitrary direction $\vec{u}$, e.g., horizontal direction $\vec{u}_H$ in the XY-plane, may be determined using an absolute precision $\sigma_{\vec{uH}}$ in the direction $\vec{u}$. FIG. 16 shows a flow diagram of a method 1600 for calculating an angular precision for a position of the target object 102. To calculate the angular precision in an arbitrary direction, the method 1600 may include determining a normal vector $\vec{u}_H$ perpendicular to a target vector $(\vec{x}_0-\vec{p}_N)$ between a position $\vec{p}_N$ of the UE 105 and a position $\vec{x}_0$ of the target object 102 and perpendicular to a unit vector in a vertical direction [0,0,1] (block 1610). The method 1600 may include determining an absolute precision in the direction $\vec{u}_H$ may be determined (block 1620), as described above, and calculating the angular precision $\sigma_\theta$ by dividing the absolute precision $\sigma_{\vec{uH}}$ by an absolute value of the target vector $\|\vec{x}_0-\vec{p}_N\|$ (block 1630). An example equation for the angular precision $\sigma_\theta$ is as follows:

$$\sigma_\theta = \frac{\sigma_{\vec{u}H}}{\|(\vec{x_0} - \vec{p_N})\|} \quad \text{(Eq. 18)}$$

The method 1600 may include comparing the angular precision on with a threshold value (block 1640), e.g., $$\frac{\pi}{3} = 60°.$$

If the angular precision on exceeds the threshold value (e.g., 60°) (as determined at block 1645), then directional information based on the position $\vec{x}_0$ of the target object 102 may be output (block 1650). If the angular precision fails to exceed the threshold value (as determined at block 1645), then the calculation of the next position of the target object 102 (as described above with reference to blocks 420 and 430 of FIG. 4) and the calculation of the position's angular precision and the comparison of with the threshold value (as described with reference to blocks 1610-1640) may be repeated. The one or more processors 210, in combination with the one or more memories 211, may comprise means for implementing blocks 1610-1660.

IMPLEMENTATION EXAMPLES

Clause 1. A method for locating a target object, comprising:

determining, by one or more processors, a plurality of position-distance values, each of the plurality of position-distance values comprising: a position of a user equipment relative to a reference position; and a distance corresponding to the position of the user equipment, the distance being between the position of the user equipment and the target object measured using one or more wireless ranging signals between the user equipment and the target object, wherein the position of the user equipment in each of the plurality of position-distance values is different; and calculating, by the one or more processors, a position of the target object using the plurality of position-distance values, wherein the position of the target object is relative to the reference position.

Clause 2. The method of clause 1, wherein the calculating of the position of the target object comprises: determining, by the one or more processors, an updated reference position: updating, by the one or more processors, one or more positions of the user equipment in the plurality of position-distance values to be relative to the updated reference position; and calculating, by the one or more processors, the position of the target object using the plurality of position-distance values, wherein the position of the target object is relative to the updated reference position.

Clause 3. The method of clause 1, wherein in the calculating of the position of the target object, the method comprises: applying a weight to one or more of the plurality of position-distance values based on one or more parameters.

Clause 4. The method of clause 3, wherein the one or more parameters is selected from the group consisting of: a radio type associated with one or more distances of the plurality of position-distance values, wherein a first radio type with a lower accuracy is weighted less than a second radio type with a higher accuracy; distance measurements by a same radio type, wherein a first distance measurement from a greater distance is weighted less than a second distance measurement from a lesser distance: a time of measurement, wherein a second measurement taken with a larger time difference from a time of a first measurement corresponding to the reference position is weighted less than a third measurement taken with a smaller time difference from the time of the first measurement corresponding to the reference position: a speed of movement of the user equipment, wherein a measurement taken with a faster user equipment speed is weighted less than a measurement taken with a slower user equipment speed: a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

Clause 5. The method of clause 1, wherein the calculating the position of the target object comprises: using the plurality of position-distance values to build a loss function; and determining the position of the target object by minimizing the loss function.

Clause 6. The method of clause 1, wherein the method further comprises: calculating a precision for the position of the target object: comparing the precision with a threshold value; and outputting directional information based on the position of the target object based on the precision exceeding the threshold value.

Clause 7. The method of clause 6, wherein the calculating of the precision comprises: calculating a precision ellipsoid centered around the position of the target object: comparing one or more dimensions of the precision ellipsoid with one or more corresponding threshold values; and outputting the directional information based on the position of the target object based on the one or more dimensions being below the one or more corresponding threshold values.

Clause 8. The method of clause 6, wherein the calculating of the precision comprises: for a direction, determining a normal vector perpendicular to a target vector between the position of the user equipment and the position of the target object and perpendicular to a vertical vector: calculating an absolute precision for the position of the target object in the direction: calculating an angular precision by dividing the absolute precision by an absolute value of the target vector: comparing the angular precision with the threshold value; and outputting the directional information based on the position of the target object based on the angular precision exceeding the threshold value.

Clause 9. A computing device, comprising:

means for determining a plurality of position-distance values, each of the plurality of position-distance values comprising: a position of a user equipment relative to a reference position; and a distance corresponding to the position of the user equipment, the distance being between the position of the user equipment and a target object measured using one or more wireless ranging signals between the user equipment and the target object, wherein the position of the user equipment in each of the plurality of position-distance values is different; and means for calculating a position of the target object using the plurality of position-distance values, wherein the position of the target object is relative to the reference position.

Clause 10. The computing device of clause 9, wherein the means for calculating the position of the target object comprises: means for determining an updated reference position: means for updating one or more positions of the user equipment in the plurality of position-distance values to be relative to the updated reference position; and means for calculating the position of the target object using the plurality of position-distance values, wherein the position of the target object is relative to the updated reference position.

Clause 11. The computing device of clause 9, wherein in the means for calculating the position of the target object, the computing device comprises: means for applying a weight to one or more of the plurality of position-distance values based on one or more parameters.

Clause 12. The computing device of clause 11, wherein the one or more parameters is selected from the group consisting of: a radio type associated with one or more distances of the plurality of position-distance values, wherein a first radio type with a lower accuracy is weighted less than a second radio type with a higher accuracy; distance measurements by a same radio type, wherein a first distance measurement from a greater distance is weighted less than a second distance measurement from a lesser distance: a time of measurement, wherein a second measurement taken with a larger time difference from a time of a first measurement corresponding to the reference position is weighted less than a third measurement taken with a smaller time difference from the time of the first measurement corresponding to the reference position: a speed of movement of the user equipment, wherein a measurement taken with a faster user equipment speed is weighted less than a measurement taken with a slower user equipment speed: a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

Clause 13. The computing device of clause 9, wherein the means for calculating the position of the target object comprises: means for using the plurality of position-distance values to build a loss function; and means for determining the position of the target object by minimizing the loss function.

Clause 14. The computing device of clause 9, further comprising: means for calculating a precision for the position of the target object: means for comparing the precision with a threshold value; and means for outputting directional information based on the position of the target object based on the precision exceeding the threshold value.

Clause 15. The computing device of clause 14, wherein the means for calculating the precision comprises: means for calculating a precision ellipsoid centered around the position of the target object: means for comparing one or more dimensions of the precision ellipsoid with one or more corresponding threshold values; and means for outputting the directional information based on the position of the target object based on the one or more dimensions being below the one or more corresponding threshold values.

Clause 16. The computing device of clause 14, wherein the means for calculating the precision comprises: for a direction, means for determining a normal vector perpendicular to a target vector between the position of the user equipment and the position of the target object and perpendicular to a vertical vector: means for calculating an absolute precision for the position of the target object in the direction; means for calculating an angular precision by dividing the absolute precision by an absolute value of the target vector: means for comparing the angular precision with the threshold value; and means for outputting the directional information based on the position of the target object based on the angular precision exceeding the threshold value.

Clause 17. A user equipment, comprising:

one or more memories; and one or more processors communicatively coupled to the one or more memories, the one or more processors being configured to:

determine a plurality of position-distance values, each of the plurality of position-distance values comprising: a position of the user equipment relative to a reference position; and a distance corresponding to the position of the user equipment, the distance being between the position of the user equipment and a target object measured using one or more wireless ranging signals between the user equipment and the target object, wherein the position of the user equipment in each of the plurality of position-distance values is different; and calculate a position of the target object using the plurality of position-distance values, wherein the position of the target object is relative to the reference position.

Clause 18. The user equipment of clause 17, wherein in the calculating of the position of the target object, the one or more processors are being configured to: determine an updated reference position: update one or more positions of the user equipment in the plurality of position-distance values to be relative to the updated reference position; and calculate the position of the target object using the plurality of position-distance values, wherein the position of the target object is relative to the updated reference position.

Clause 19. The user equipment of clause 17, wherein in the calculating of the position of the target object, the one or more processors are being configured to: apply a weight to one or more of the plurality of position-distance values based on one or more parameters.

Clause 20. The user equipment of clause 19, wherein the one or more parameters is selected from the group consisting of: a radio type associated with one or more distances of the plurality of position-distance values, wherein a first radio type with a lower accuracy is weighted less than a second radio type with a higher accuracy; distance measurements by a same radio type, wherein a first distance measurement from a greater distance is weighted less than a second distance measurement from a lesser distance: a time of measurement, wherein a second measurement taken with a larger time difference from a time of a first measurement corresponding to the reference position is weighted less than a third measurement taken with a smaller time difference from the time of the first measurement corresponding to the reference position: a speed of movement of the user equipment, wherein a measurement taken with a faster user equipment speed is weighted less than a measurement taken with a slower user equipment speed: a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

Clause 21. The user equipment of clause 17, wherein in the calculating the position of the target object, the one or more processors are being configured to: use the plurality of position-distance values to build a loss function; and determine the position of the target object by minimizing the loss function.

Clause 22. The user equipment of clause 17, wherein the one or more processors are further being configured to: calculate a precision for the position of the target object; compare the precision with a threshold value; and output directional information based on the position of the target object based on the precision exceeding the threshold value.

Clause 23. The user equipment of clause 22, wherein in the calculating of the precision, the one or more processors are being configured to: calculate a precision ellipsoid centered around the position of the target object: compare one or more dimensions of the precision ellipsoid with one or more corresponding threshold values; and output the directional information based on the position of the target object based on the one or more dimensions being below the one or more corresponding threshold values.

Clause 24. The user equipment of clause 22, wherein in the calculating of the precision, the one or more processors are being configured to: for a direction, determine a normal vector perpendicular to a target vector between the position of the user equipment and the position of the target object and perpendicular to a vertical vector; calculate an absolute precision for the position of the target object in the direction; calculate an angular precision by dividing the absolute precision by an absolute value of the target vector: compare the angular precision with the threshold value; and output the directional information based on the position of the target object based on the angular precision exceeding the threshold value.

Clause 25. A non-transitory, processor-readable storage medium comprising processor-readable instructions to cause one or more processors to:

determine a plurality of position-distance values, each of the plurality of position-distance values comprising: a position of a user equipment relative to a reference position; and a distance corresponding to the position of the user equipment, the distance being between the position of the user equipment and a target object measured using one or more wireless ranging signals between the user equipment and the target object, wherein the position of the user equipment in each of the plurality of position-distance values is different; and calculate a position of the target object using the plurality of position-distance values, wherein the position of the target object is relative to the reference position.

Clause 26. The non-transitory, processor-readable storage medium of clause 25, wherein the processor-readable instructions to cause the one or more processors to calculate the position of the target object comprise processor-readable instructions to cause the one or more processors to: determine an updated reference position: update one or more positions of the user equipment in the plurality of position-distance values to be relative to the updated reference position; and calculate the position of the target object using the plurality of position-distance values, wherein the position of the target object is relative to the updated reference position.

Clause 27. The non-transitory, processor-readable storage medium of clause 17, wherein the processor-readable instructions to cause the one or more processors to calculate the position of the target object comprise processor-readable instructions to cause the one or more processors to: apply a weight to one or more of the plurality of position-distance values based on one or more parameters.

Clause 28. The non-transitory, processor-readable storage medium of clause 27, wherein the one or more parameters is selected from the group consisting of: a radio type associated with one or more distances of the plurality of position-distance values, wherein a first radio type with a lower accuracy is weighted less than a second radio type with a higher accuracy: distance measurements by a same radio type, wherein a first distance measurement from a greater distance is weighted less than a second distance measurement from a lesser distance: a time of measurement, wherein a second measurement taken with a larger time difference from a time of a first measurement corresponding to the reference position is weighted less than a third measurement taken with a smaller time difference from the time of the first measurement corresponding to the reference position: a speed of movement of the user equipment, wherein a measurement taken with a faster user equipment speed is weighted less than a measurement taken with a slower user equipment speed: a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

Clause 29. The non-transitory, processor-readable storage medium of clause 25, wherein the processor-readable instructions to cause the one or more processors to calculate the position of the target object comprise processor-readable instructions to cause the one or more processors to: use the plurality of position-distance values to build a loss function; and determine the position of the target object by minimizing the loss function.

Clause 30. The non-transitory, processor-readable storage medium of clause 25, further comprising processor-readable instructions to cause the one or more processors to: calculate a precision for the position of the target object: compare the precision with a threshold value; and output directional information based on the position of the target object based on the precision exceeding the threshold value.

Clause 31. The non-transitory, processor-readable storage medium of clause 30, wherein the processor-readable instructions to cause the one or more processors to calculate the precision comprise processor-readable instructions to cause the one or more processors to: calculate a precision ellipsoid centered around the position of the target object: compare one or more dimensions of the precision ellipsoid with one or more corresponding threshold values; and output the directional information based on the position of the target object based on the one or more dimensions being below the one or more corresponding threshold values.

Clause 32. The non-transitory, processor-readable storage medium of clause 30, wherein the processor-readable instructions to cause the one or more processors to calculate the precision comprise processor-readable instructions to cause the one or more processors to: for a direction, determine a normal vector perpendicular to a target vector between the position of the user equipment and the position of the target object and perpendicular to a vertical vector: calculate an absolute precision for the position of the target object in the direction: calculate an angular precision by dividing the absolute precision by an absolute value of the target vector: compare the angular precision with the threshold value; and output the directional information based on the position of the target object based on the angular precision exceeding the threshold value.

Clause 33. A user equipment, comprising:

one or more memories; and one or more processors communicatively coupled to the one or more memories, the one or more processors being configured to:

receive a request for a location of a target object;

transmit to or receive from the target object first wireless ranging signals, the user equipment being at a first position:

transmit to or receive from the target object second wireless ranging signals, the user equipment being at a second position different from the first position;

transmit to or receive from the target object third wireless ranging signals, the user equipment being at a third position different from the first position and the second position; and display directional information to the location of the target object based on the transmit to or receive from the target object the first, second, and third wireless ranging signals.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method for locating a target object, comprising:

determining, by one or more processors, a plurality of position-distance values, each of the plurality of position-distance values comprising: a position of a user equipment relative to a reference position; and a distance corresponding to the position of the user equipment, the distance being between the position of the user equipment and the target object measured using one or more wireless ranging signals between the user equipment and the target object, wherein the position of the user equipment in each of the plurality of position-distance values is different;

calculating, by the one or more processors, a position of the target object using the plurality of position-distance values, wherein the position of the target object is relative to the reference position:

calculating a precision for the position of the target object, including:

for a direction, determining a normal vector perpendicular to a target vector between the position of the user equipment and the position of the target object and perpendicular to a vertical vector, calculating an absolute precision for the position of the target object in the direction, and calculating an angular precision by dividing the absolute precision by an absolute value of the target vector;

comparing the angular precision with a threshold value; and outputting directional information based on the position of the target object based on the angular precision exceeding the threshold value.

2. The method of claim 1, wherein the calculating of the position of the target object comprises:

determining, by the one or more processors, an updated reference position;

updating, by the one or more processors, one or more positions of the user equipment in the plurality of position-distance values to be relative to the updated reference position; and calculating, by the one or more processors, the position of the target object using the plurality of position-distance values, wherein the position of the target object is relative to the updated reference position.

3. The method of claim 1, wherein in the calculating of the position of the target object, the method comprises:

applying a weight to one or more of the plurality of position-distance values based on one or more parameters.

4. The method of claim 3, wherein the one or more parameters is selected from the group consisting of: a radio type associated with one or more distances of the plurality of position-distance values, wherein a first radio type with a lower accuracy is weighted less than a second radio type with a higher accuracy; distance measurements by a same radio type, wherein a first distance measurement from a greater distance is weighted less than a second distance measurement from a lesser distance; a time of measurement, wherein a second measurement taken with a larger time difference from a time of a first measurement corresponding to the reference position is weighted less than a third measurement taken with a smaller time difference from the time of the first measurement corresponding to the reference position; a speed of movement of the user equipment, wherein a measurement taken with a faster user equipment speed is weighted less than a measurement taken with a slower user equipment speed; a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

5. The method of claim 1, wherein the calculating the position of the target object comprises:

using the plurality of position-distance values to build a loss function; and determining the position of the target object by minimizing the loss function.

6. The method of claim 1, wherein the calculating of the precision comprises:

calculating a precision ellipsoid centered around the position of the target object;

comparing one or more dimensions of the precision ellipsoid with one or more corresponding threshold values; and outputting the directional information based on the position of the target object based on the one or more dimensions being below the one or more corresponding threshold values.

7. A computing device, comprising:

means for determining a plurality of position-distance values, each of the plurality of position-distance values comprising: a position of a user equipment relative to a reference position;

and a distance corresponding to the position of the user equipment, the distance being between the position of the user equipment and a target object measured using one or more wireless ranging signals between the user equipment and the target object, wherein the position of the user equipment in each of the plurality of position-distance values is different;

means for calculating a position of the target object using the plurality of position-distance values, wherein the position of the target object is relative to the reference position;

means for calculating a precision for the position of the target object, including:

for a direction, means for determining a normal vector perpendicular to a target vector between the position of the user equipment and the position of the target object and perpendicular to a vertical vector, means for calculating an absolute precision for the position of the target object in the direction, and means for calculating an angular precision by dividing the absolute precision by an absolute value of the target vector;

means for comparing the angular precision with a threshold value; and means for outputting the directional information based on the position of the target object based on the angular precision exceeding the threshold value.

8. The computing device of claim 7, wherein the means for calculating the position of the target object comprises:

means for determining an updated reference position;

means for updating one or more positions of the user equipment in the plurality of position-distance values to be relative to the updated reference position; and means for calculating the position of the target object using the plurality of position-distance values, wherein the position of the target object is relative to the updated reference position.

9. The computing device of claim 7, wherein in the means for calculating the position of the target object, the computing device comprises:

means for applying a weight to one or more of the plurality of position-distance values based on one or more parameters.

10. The computing device of claim 9, wherein the one or more parameters is selected from the group consisting of: a radio type associated with one or more distances of the plurality of position-distance values, wherein a first radio type with a lower accuracy is weighted less than a second radio type with a higher accuracy; distance measurements by a same radio type, wherein a first distance measurement from a greater distance is weighted less than a second distance measurement from a lesser distance; a time of measurement, wherein a second measurement taken with a larger time difference from a time of a first measurement corresponding to the reference position is weighted less than a third measurement taken with a smaller time difference from the time of the first measurement corresponding to the reference position; a speed of movement of the user equipment, wherein a measurement taken with a faster user equipment speed is weighted less than a measurement taken with a slower user equipment speed; a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

11. The computing device of claim 7, wherein the means for calculating the position of the target object comprises:

means for using the plurality of position-distance values to build a loss function; and means for determining the position of the target object by minimizing the loss function.

12. The computing device of claim 7, wherein the means for calculating the precision comprises:

means for calculating a precision ellipsoid centered around the position of the target object;

means for comparing one or more dimensions of the precision ellipsoid with one or more corresponding threshold values; and means for outputting the directional information based on the position of the target object based on the one or more dimensions being below the one or more corresponding threshold values.

13. A user equipment, comprising:

one or more memories; and one or more processors communicatively coupled to the one or more memories, the one or more processors being configured to:

determine a plurality of position-distance values, each of the plurality of position-distance values comprising: a position of the user equipment relative to a reference position; and a distance corresponding to the position of the user equipment, the distance being between the position of the user equipment and a target object measured using one or more wireless ranging signals between the user equipment and the target object, wherein the position of the user equipment in each of the plurality of position-distance values is different;

calculate a position of the target object using the plurality of position-distance values, wherein the position of the target object is relative to the reference position;

calculate a precision for the position of the target object, including:

for a direction, determine a normal vector perpendicular to a target vector between the position of the user equipment and the position of the target object and perpendicular to a vertical vector, calculate an absolute precision for the position of the target object in the direction, and calculate an angular precision by dividing the absolute precision by an absolute value of the target vector;

compare the angular precision with a threshold value; and output the directional information based on the position of the target object based on the angular precision exceeding the threshold value.

14. The user equipment of claim 13, wherein in the calculating of the position of the target object, the one or more processors are being configured to:

determine an updated reference position;

update one or more positions of the user equipment in the plurality of position-distance values to be relative to the updated reference position; and calculate the position of the target object using the plurality of position-distance values, wherein the position of the target object is relative to the updated reference position.

15. The user equipment of claim 13, wherein in the calculating of the position of the target object, the one or more processors are being configured to:

apply a weight to one or more of the plurality of position-distance values based on one or more parameters.

16. The user equipment of claim 15, wherein the one or more parameters is selected from the group consisting of: a radio type associated with one or more distances of the plurality of position-distance values, wherein a first radio type with a lower accuracy is weighted less than a second radio type with a higher accuracy; distance measurements by a same radio type, wherein a first distance measurement from a greater distance is weighted less than a second distance measurement from a lesser distance; a time of measurement, wherein a second measurement taken with a larger time difference from a time of a first measurement corresponding to the reference position is weighted less than a third measurement taken with a smaller time difference from the time of the first measurement corresponding to the reference position; a speed of movement of the user equipment, wherein a measurement taken with a faster user equipment speed is weighted less than a measurement taken with a slower user equipment speed; a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

17. The user equipment of claim 13, wherein in the calculating the position of the target object, the one or more processors are being configured to:

use the plurality of position-distance values to build a loss function; and determine the position of the target object by minimizing the loss function.

18. The user equipment of claim 13, wherein in the calculating of the precision, the one or more processors are being configured to:

calculate a precision ellipsoid centered around the position of the target object;

compare one or more dimensions of the precision ellipsoid with one or more corresponding threshold values; and output the directional information based on the position of the target object based on the one or more dimensions being below the one or more corresponding threshold values.

19. A non-transitory, processor-readable storage medium comprising processor-readable instructions to cause one or more processors to:

determine a plurality of position-distance values, each of the plurality of position-distance values comprising: a position of a user equipment relative to a reference position; and a distance corresponding to the position of the user equipment, the distance being between the position of the user equipment and a target object measured using one or more wireless ranging signals between the user equipment and the target object, wherein the position of the user equipment in each of the plurality of position-distance values is different;

calculate a position of the target object using the plurality of position-distance values, wherein the position of the target object is relative to the reference position;

calculate a precision for the position of the target object, including:

for a direction, determine a normal vector perpendicular to a target vector between the position of the user equipment and the position of the target object and perpendicular to a vertical vector, calculate an absolute precision for the position of the target object in the direction, and calculate an angular precision by dividing the absolute precision by an absolute value of the target vector;

compare the angular precision with a threshold value; and output the directional information based on the position of the target object based on the angular precision exceeding the threshold value.

20. The non-transitory, processor-readable storage medium of claim 19, wherein the processor-readable instructions to cause the one or more processors to calculate the position of the target object comprise processor-readable instructions to cause the one or more processors to:

determine an updated reference position;

update one or more positions of the user equipment in the plurality of position-distance values to be relative to the updated reference position; and calculate the position of the target object using the plurality of position-distance values, wherein the position of the target object is relative to the updated reference position.

21. The non-transitory, processor-readable storage medium of claim 13, wherein the processor-readable instructions to cause the one or more processors to calculate the position of the target object comprise processor-readable instructions to cause the one or more processors to:

apply a weight to one or more of the plurality of position-distance values based on one or more parameters.

22. The non-transitory, processor-readable storage medium of claim 21, wherein the one or more parameters is selected from the group consisting of: a radio type associated with one or more distances of the plurality of position-distance values, wherein a first radio type with a lower accuracy is weighted less than a second radio type with a higher accuracy; distance measurements by a same radio type, wherein a first distance measurement from a greater distance is weighted less than a second distance measurement from a lesser distance; a time of measurement, wherein a second measurement taken with a larger time difference from a time of a first measurement corresponding to the reference position is weighted less than a third measurement taken with a smaller time difference from the time of the first measurement corresponding to the reference position; a speed of movement of the user equipment, wherein a measurement taken with a faster user equipment speed is weighted less than a measurement taken with a slower user equipment speed; a movement of the target object, wherein a measurement taken before the movement of the target object is weighted less than a measurement taken after the movement of the target object; and a standard deviation of a measurement based on a wireless ranging signal strength, wherein a first wireless ranging signal is weighted less than a second wireless ranging signal with a smaller standard deviation than the first wireless ranging signal.

23. The non-transitory, processor-readable storage medium of claim 19, wherein the processor-readable instructions to cause the one or more processors to calculate the position of the target object comprise processor-readable instructions to cause the one or more processors to:

use the plurality of position-distance values to build a loss function; and determine the position of the target object by minimizing the loss function.

* * * * *